United States Patent
Suda et al.

(10) Patent No.: US 10,480,402 B2
(45) Date of Patent: Nov. 19, 2019

(54) ACTUATOR OF LINK MECHANISM FOR INTERNAL COMBUSTION ENGINE

(71) Applicant: HITACHI AUTOMOTIVE SYSTEMS, LTD., Hitachinaka-shi, Ibaraki (JP)

(72) Inventors: Yoshihiro Suda, Hitachinaka (JP); Kotofumi Yanai, Utsunomiya (JP); Kishiro Nagai, Atsugi (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 5 days.

(21) Appl. No.: 15/748,265

(22) PCT Filed: Jul. 13, 2016

(86) PCT No.: PCT/JP2016/070625
§ 371 (c)(1),
(2) Date: Jan. 29, 2018

(87) PCT Pub. No.: WO2017/022434
PCT Pub. Date: Feb. 9, 2017

(65) Prior Publication Data
US 2018/0223730 A1 Aug. 9, 2018

(30) Foreign Application Priority Data
Jul. 31, 2015 (JP) ................................ 2015-152661

(51) Int. Cl.
*F02B 75/04* (2006.01)
*F02B 75/32* (2006.01)
(Continued)

(52) U.S. Cl.
CPC ............ *F02B 75/048* (2013.01); *F01B 31/14* (2013.01); *F02B 75/04* (2013.01); *F02B 75/045* (2013.01);
(Continued)

(58) Field of Classification Search
CPC ...... F02B 75/048; F02B 75/045; F02B 75/04; F02B 75/32; F02D 15/02; F02D 15/00;
(Continued)

(56) References Cited

U.S. PATENT DOCUMENTS 8,881,695 B2* 11/2014 Hiyoshi ............... F02B 75/048
123/48 A
2013/0306035 A1 11/2013 Hiyoshi et al.
(Continued)

FOREIGN PATENT DOCUMENTS

JP 2001-263025 A 9/2001
JP 2008-267511 A 11/2008
(Continued)

*Primary Examiner* — Grant Moubry
(74) *Attorney, Agent, or Firm* — Foley & Lardner LLP

(57) ABSTRACT

Provided is an actuator of a link mechanism for an internal combustion engine, in which a speed reducer is sufficiently lubricated. The actuator includes an oil passage formed in a control shaft for changing the posture of a control link and configured to feed lubricant oil to the speed reducer; and an open portion which opens to face the speed reducer in one end side located on the speed reducer side, and which is in communication with the oil passage in the other end side. An inner diameter of the one end side of the open portion is larger than an outer diameter of one end side of the oil passage.

13 Claims, 12 Drawing Sheets

(51) Int. Cl.
    *F02D 15/02*      (2006.01)
    *F16H 57/04*      (2010.01)
    *F16H 1/32*      (2006.01)
    *F01B 31/14*      (2006.01)
    *F01C 21/00*      (2006.01)
    *F01L 1/344*      (2006.01)
    *F16H 49/00*      (2006.01)

(52) U.S. Cl.
    CPC ............... *F02B 75/32* (2013.01); *F16H 1/32* (2013.01); *F16H 57/04* (2013.01); *F16H 57/0482* (2013.01); *F01C 21/008* (2013.01); *F01L 1/344* (2013.01); *F02D 15/02* (2013.01); *F16H 49/001* (2013.01)

(58) Field of Classification Search
    CPC ...... F01B 31/14; F16H 57/04; F16H 57/0482; F16H 1/32; F16H 49/001; F01M 9/00; F01M 9/10; F01M 11/02; F01M 2011/021
    See application file for complete search history.

(56) References Cited

U.S. PATENT DOCUMENTS

| | | | |
|---|---|---|---|
| 2013/0306036 A1* | 11/2013 | Hiyoshi | F02B 75/04 |
| | | | 123/48 R |
| 2014/0290625 A1 | 10/2014 | Hiyoshi et al. | |
| 2015/0322826 A1 | 11/2015 | Yamanaka et al. | |

FOREIGN PATENT DOCUMENTS

| | | |
|---|---|---|
| JP | 2013-241846 A | 12/2013 |
| JP | 2016-138568 A | 8/2016 |
| WO | WO-2013-080674 A1 | 4/2015 |
| WO | WO-2014-010550 A1 | 6/2016 |

* cited by examiner

US 10,480,402 B2

ACTUATOR OF LINK MECHANISM FOR INTERNAL COMBUSTION ENGINE

TECHNICAL FIELD

The invention relates to an actuator of a link mechanism for an internal combustion engine.

BACKGROUND ART

As a technology of this type, the technology discussed in the undernoted Patent Literature 1 is disclosed. The Patent Literature 1 discloses a variable compression ratio mechanism in which the compression ratio of an internal combustion engine can be varied by changing the stroke characteristics of a piston using a double-link piston crank mechanism.

CITATION LIST

Patent Literature

PTL 1: Japanese Unexamined Patent Application Publication (Kokai) No. 2013-241846

SUMMARY OF INVENTION

It is necessary to feed lubricant oil to a speed reducer between an electric motor and a link. However, the technology disclosed in the Patent Literature 1 does not clearly teach about oil passages for feeding lubricant oil to a speed reducer. Simple feeding of the lubricant oil cannot fully lubricate the speed reducer, and might lead to poor lubrication of the speed reducer.

An object of the invention is to provide an actuator of a link mechanism for an internal combustion engine, which is capable of providing a sufficient lubrication of a speed reducer.

Solution to Problem

An actuator of a link mechanism for an internal combustion engine according to one embodiment of the invention comprises an oil passage formed in a control shaft which changes a posture of a control link, and an open portion which opens to face the speed reducer in one end side located on a speed reducer side, and which is in communication with the oil passage in the other end side. An inner diameter of the one end side of the open portion is larger than an outer diameter of one end side of the oil passage.

An actuator of a link mechanism for an internal combustion engine according to another embodiment of the invention comprises an oil passage formed in a control shaft which varies characteristics of a variable compression ratio mechanism of an internal combustion engine, and an open portion which opens to face the speed reducer in one end side located on a speed reducer side, and which is in communication with the oil passage in the other end side. An inner diameter of the one end side of the open portion is larger than an outer diameter of the control shaft.

An actuator of a link mechanism for an internal combustion engine according to still another embodiment of the invention comprises an oil passage formed in a control shaft which changes a posture of a control link, and an open portion which opens to face the speed reducer in one end side located on a speed reducer side, in a rotation axis direction of the speed reducer, and which is in communication with the oil passage in the other end side.

Advantageous Effects of Invention

The speed reducer is therefore improved in lubricity.

DESCRIPTION OF EMBODIMENTS

Embodiment 1

Figure 1:
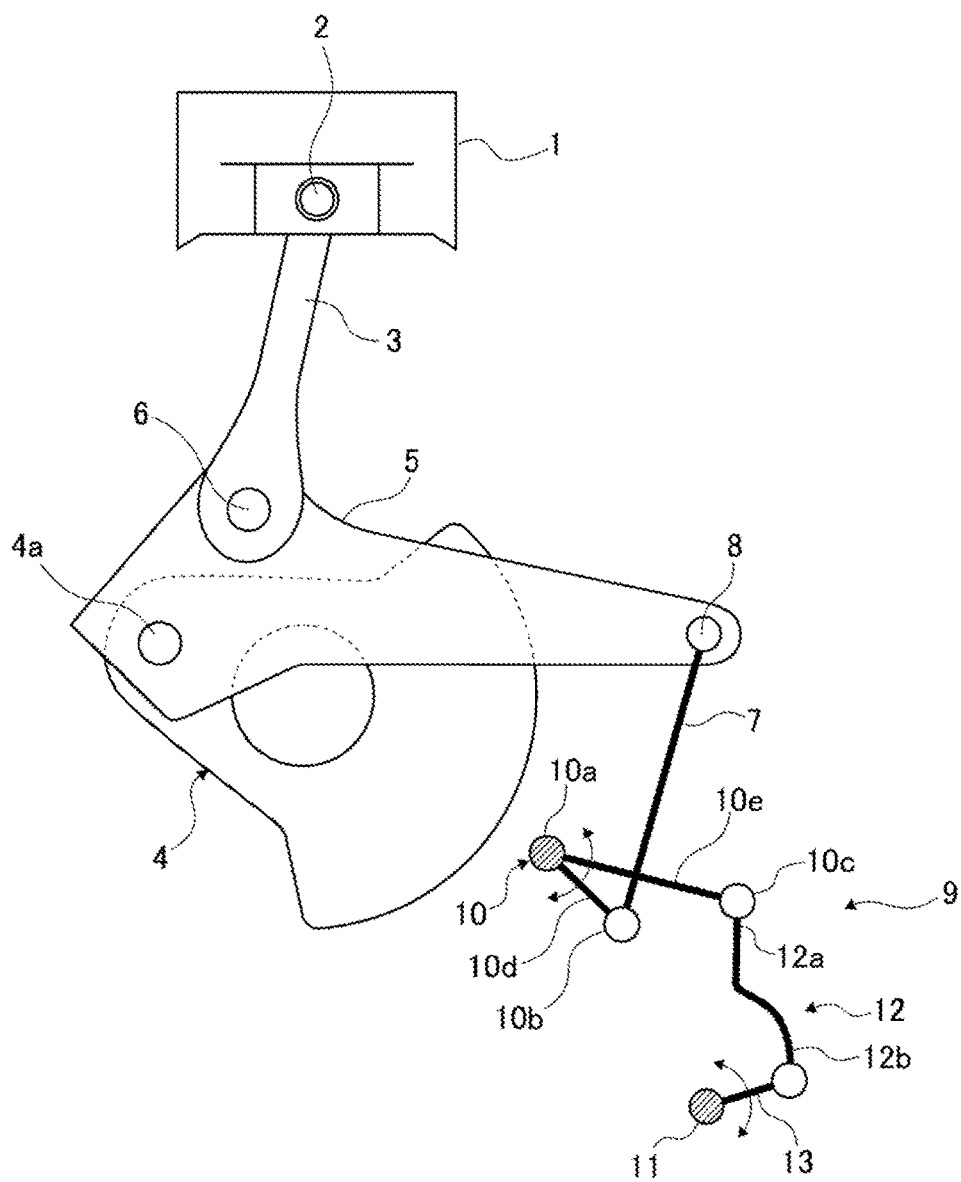
FIG. 1 is a schematic view of an internal combustion engine having an actuator of a link mechanism for an internal combustion engine according to the invention.

FIG. 1 is a schematic view of an internal combustion engine having an actuator of a link mechanism for an internal combustion engine according to one embodiment of the invention. A basic configuration is the same as the one described in FIG. 1 of Japanese Unexamined Patent Application Publication (Kokai) No. 2011-169152, and therefore will be briefly explained below.

A piston 1 which reciprocates within a cylinder of a cylinder block of the internal combustion engine is rotatably coupled to an upper end of an upper link 3 via a piston pin 2. A lower link 5 is rotatably coupled to a lower end of the upper link 3 via a coupling pin 6. The lower link 5 is rotatably coupled to a crankshaft 4 via a crank pin 4a. The lower link 5 is rotatably coupled to an upper end portion of a first control link 7 via a coupling pin 8. The first control link 7 has a lower end portion which is coupled to a link mechanism 9 including a plurality of link members. The link mechanism 9 includes a first control shaft 10, a second control shaft 11, and a second control link 12 coupling the first control shaft 10 and the second control shaft 11 together.

The first control shaft 10 extends parallel to the crankshaft 4 extending in a direction of a cylinder bank in the inside of the internal combustion engine. The first control shaft 10 includes a first journal 10a which is rotatably supported by a main body of the internal combustion engine, a control eccentric shaft 10b which is rotatably coupled to the lower end portion of the first control link 7, and an eccentric shaft 10c which is rotatably coupled to one end portion 12a of the second control link 12.

A first arm 10d has one end which is coupled to the first journal 10a, and the other end which is coupled to the lower end portion of the first control link 7. The control eccentric shaft 10b is disposed in a position which is eccentric by predetermined amount in relation to the first journal 10a. A second arm 10e has one end which is coupled to the first journal 10a, and the other end which is coupled to the one end portion 12a of the second control link 12.

The eccentric shaft 10c is disposed in a position which is eccentric by predetermined amount in relation to the first journal 10a. The second control link 12 has the other end portion 12b which is rotatably coupled to one end of an arm link 13. The other end of the arm link 13 is coupled to the second control shaft 11. The arm link 13 and the second control shaft 11 do not make relative displacement. The second control shaft 11 is rotatably supported through a plurality of journals within an undermentioned housing 20.

The second control link 12 has a shape like a lever. The one end portion 12a of the second control link 12, which is coupled to the eccentric shaft 10c, is formed in a substantially linear manner. The other end portion 12b coupled to the arm link 13 is curved. The one end portion 12a has a distal end portion through which a through-hole 12c is formed. The eccentric shaft 10c is turnably inserted in the through-hole 12c (see FIG. 2). The other end portion 12b has a distal end portion 12d formed into a two-pronged shape as shown in a sectional view of the actuator in FIG. 6. A coupling hole 12e is formed through the distal end portion 12d. The arm link 13 has a projection 13b through which a coupling hole 13c is formed. The coupling hole 13c has substantially the same diameter as the coupling hole 12e. The projection 13b of the arm link 13 is tucked between each of the distal end portions 12d formed into the two-pronged shape. In this state, the coupling pin 14 extends through the coupling holes 12e and 13c to be secured by press fitting.

Figure 5:
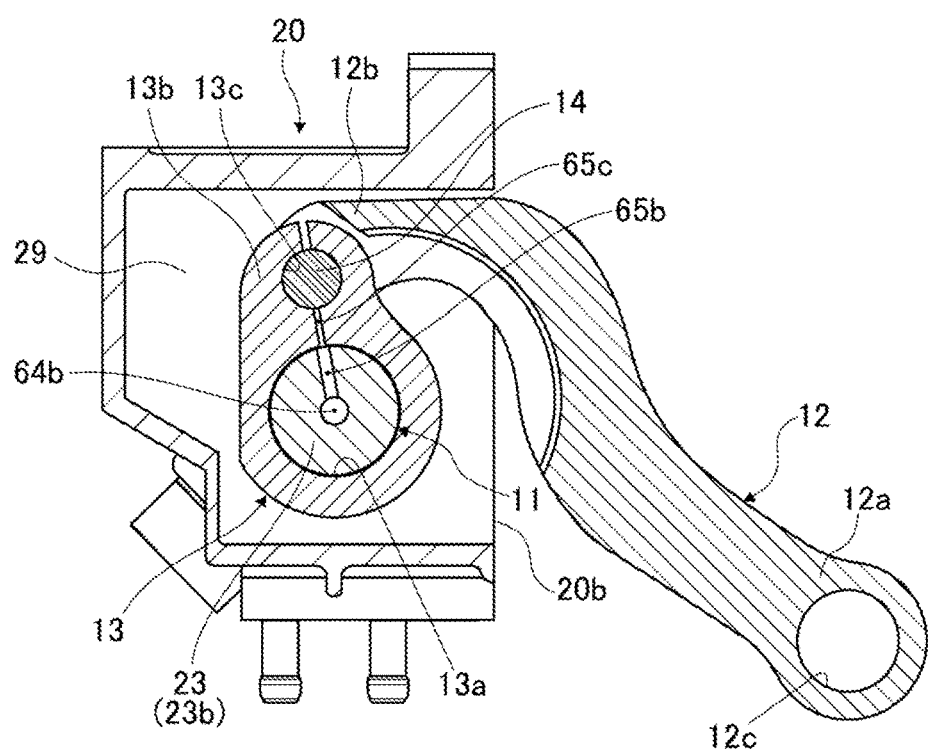
FIG. 5 is a sectional view of a main part of the actuator of a link mechanism for an internal combustion engine according to the Embodiment 1.

The arm link 13 is formed as a separate body from the second control shaft 11 as shown in a sectional view of a main part of the actuator in FIG. 5. The arm link 13 includes a ring-like portion which is a thick-walled member made of ferrous metal. A press-fitting hole 13a extends through the substantially center of the ring-like portion. The arm link 13 further includes the U-shaped projection 13b projecting toward an outer periphery. Press-fitted into the press-fitting hole 13a is a fixed portion 23b which is formed between the journals of the second control shaft 11. Due to the press-fitting, the second control shaft 11 and the arm link 13 are secured to each other. The projection 13b has the coupling hole 13c formed therein. The coupling pin 14 is rotatably supported in the projection 13b. The coupling hole 13c has an axial core (axial core of the coupling pin 14) which is radially eccentric to an axial core of the second control shaft 11 by predetermined amount.

A rotational position of the second control shaft 11 is changed by torque transmitted from a drive motor 22 though a wave gear-type speed reducer 21 that is a part of the actuator of a link mechanism for an internal combustion engine. Upon the change of the rotational position of the second control shaft 11, a posture of the second control link 12 is changed to make the first control shaft 10 rotate, to thereby change a position of the lower end portion of the first control link 7. This changes a posture of the lower link 5, changing a stroke position and a stroke amount in a cylinder of the piston 1. Along with this change, an engine compression ratio is varied.

[Configuration of the Actuator of a Link Mechanism for an Internal Combustion Engine]

Figure 2:
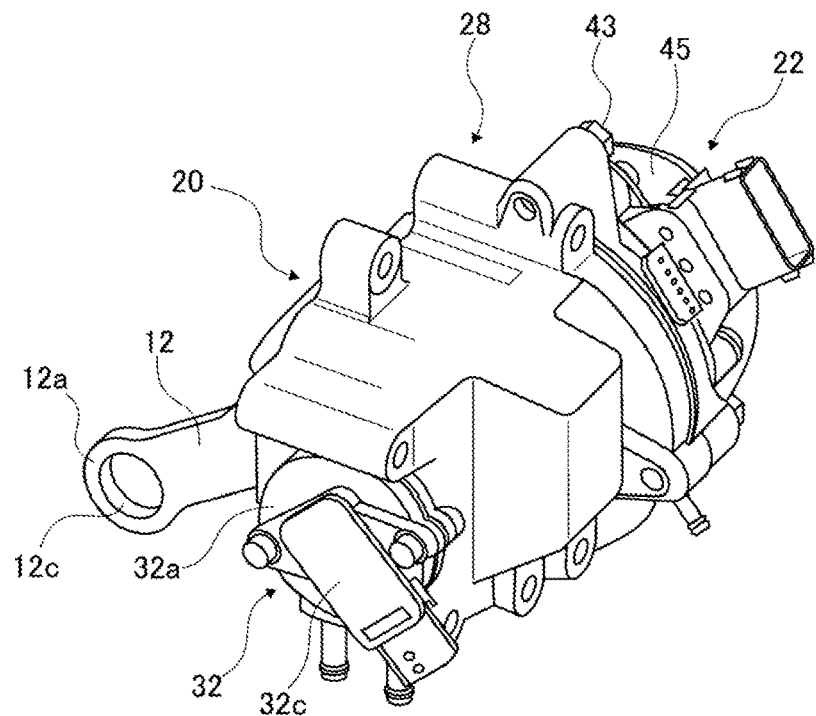
FIG. 2 is a perspective view of an actuator of a link mechanism for an internal combustion engine according to an Embodiment 1.
Figure 3:
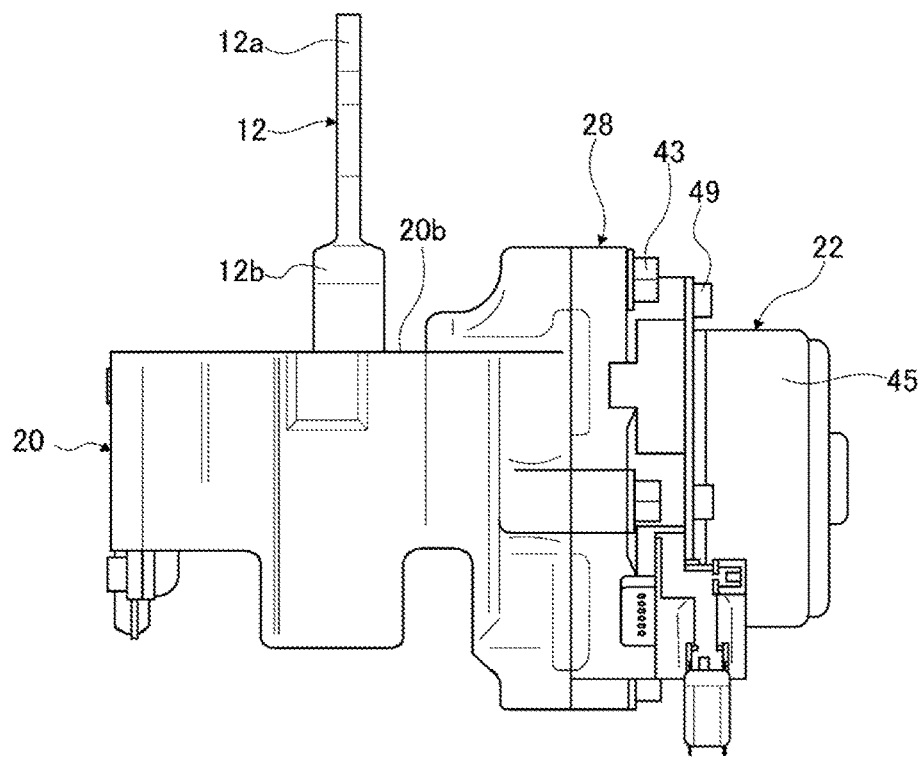
FIG. 3 is a plan view of the actuator of a link mechanism for an internal combustion engine according to the Embodiment 1.
Figure 4:
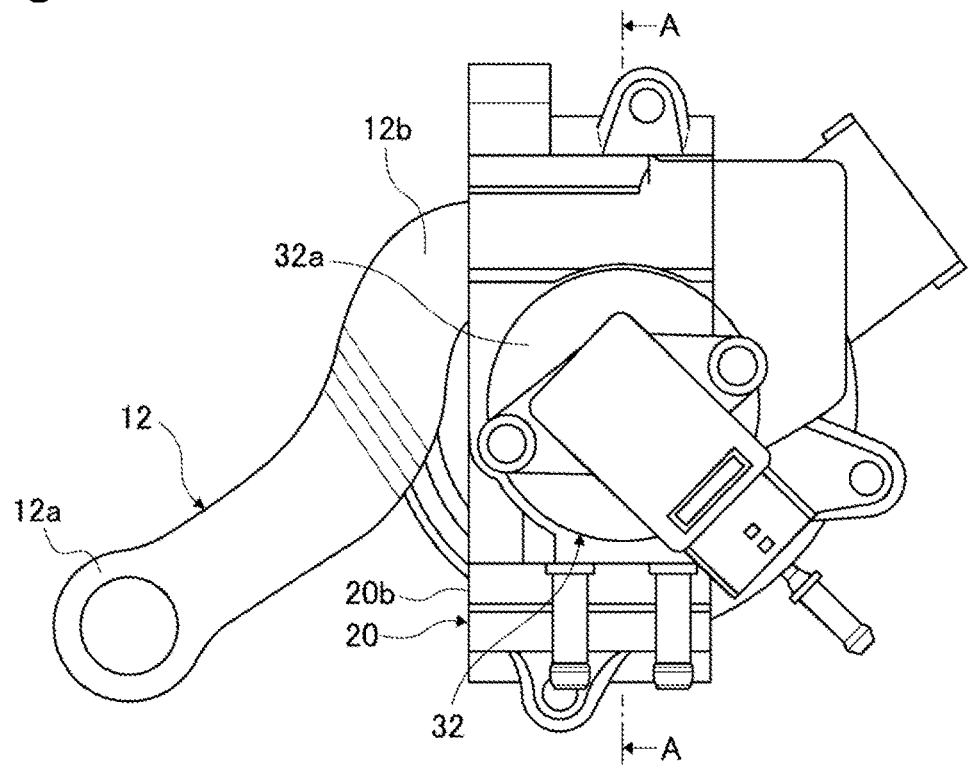
FIG. 4 is a left-side view of the actuator of a link mechanism for an internal combustion engine according to the Embodiment 1.
Figure 6:
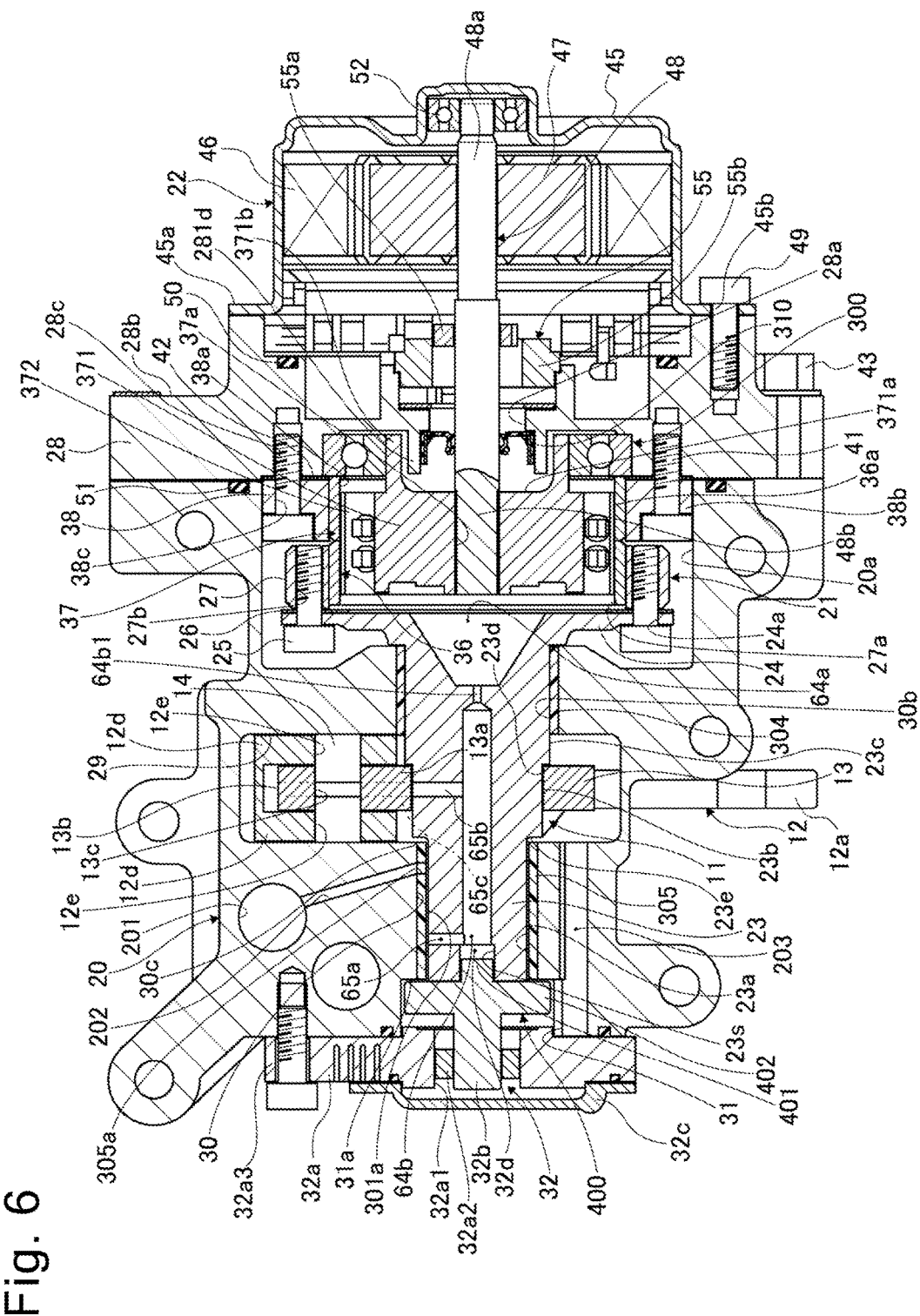
FIG. 6 is a sectional view of the actuator of a link mechanism for an internal combustion engine according to the Embodiment 1.

FIG. 2 is a perspective view of an actuator of a link mechanism for an internal combustion engine according to an Embodiment 1; FIG. 3 is a plan view of the actuator of a link mechanism for an internal combustion engine according to the Embodiment 1; FIG. 4 is a left-side view of the actuator of a link mechanism for an internal combustion engine according to the Embodiment 1; FIG. 5 is a sectional view of a main part of the actuator of a link mechanism for an internal combustion engine according to the Embodiment 1; and FIG. 6 is a sectional view along the line A-A in FIG. 4. As shown in FIGS. 2 to 6, the actuator of a link mechanism for an internal combustion engine includes the drive motor 22, the wave gear-type speed reducer 21 mounted on a distal end side of the drive motor 22, the housing 20 which houses the wave gear-type speed reducer 21 in the inside thereof, and the second control shaft 11 which is rotatably supported against the housing 20.

(Configuration of the Drive Motor)

The drive motor 22 is a brushless motor and includes a motor casing 45 having a shape like a bottomed cylinder, a cylindrical coil 46 secured to an inner peripheral surface of the motor casing 45, a rotor 47 which is rotatably disposed inside the coil 46, a motor drive shaft 48 having one end portion 48a secured at center of the rotor 47, and a resolver 55 configured to detect a rotation angle of the motor drive shaft 48.

The motor drive shaft 48 is rotationally supported by a ball bearing 52 disposed in a bottom of the motor casing 45. The motor casing 45 has four bosses 45a in an outer periphery of a front end thereof. Each of the bosses 45a is pierced with a bolt insertion hole 45b through which a bolt 49 is inserted.

The resolver 55 includes a resolver rotor 55a which is secured by press-fitting to an outer periphery of the motor drive shaft 48, and a sensor 55b configured to detect a multi-toothed target formed in an outer peripheral surface of the resolver rotor 55a. The resolver 55 is disposed in a position protruding from an opening of the motor casing 45. The sensor 55b is secured in the inside of a cover 28 by means of two screws and outputs a detection signal to a control unit, not shown. To attach the motor casing 45 to the cover 28, the bolts 49 are inserted into the bosses 45a with an O-ring 50 intervening between an end face of the resolver 55 and the cover 28, and the bolts 49 are screwed to external thread portions formed in the drive motor 22 side of the cover 28. The motor casing 45 is thus secured to the cover 28. A motor housing chamber which houses the drive motor 22 by the motor casing 45 and the cover 28 is configured as a dry chamber which is not fed with lubricant oil or the like.

(Configuration of the Second Control Shaft)

The second control shaft 11 includes a shaft main body 23 extending in a rotation axis direction, and a fixing flange 24 formed by increasing a diameter of the shaft main body 23. The shaft main body 23 and the fixing flange 24 of the second control shaft 11 are integrally formed by forging ferrous metal. The shaft main body 23 is provided with steps in the rotation axis direction. The shaft main body 23 accordingly includes a first journal 23a with a small diameter in a distal end portion side, a fixed portion 23b with a medium diameter, onto which the press-fitting hole 13a of the arm link 13 is press-fitted from the first journal 23a side, and a second journal 23c with a larger diameter in the fixing flange 24 side. A first stepped portion 23d is formed between the fixed portion 23b and the second journal 23c. A second stepped portion 23e is formed between the first journal 23a and the fixed portion 23b.

When the press-fitting hole 13a of the arm link 13 is press-fitted onto the fixed portion 23b from the first journal 23a side, the first stepped portion 23d comes into contact from the axial direction with one end portion of the press-fitting hole 13a, which is located on the second journal 23c side. This regulates displacement of the arm link 13 toward the second journal 23c. When the shaft main body 23 is inserted into a first bearing 305 press-fitted in a support hole 30 formed within the housing 20, the second stepped portion 23e comes into contact with a stepped hole edge 30c of the support hole 30 and the first bearing 305. The second stepped portion 23e thus regulates a displacement in an opposite direction to the wave gear-type speed reducer 21 side along a rotation axis of the second control shaft 11. The shaft main body 23 is rotatable within a first bearing hole 301a of the first bearing 305 and supported to be slightly displaceable in the rotation axis direction. In other words, there is a small gap between an inner periphery of the first bearing hole 301a and the shaft main body 23.

In the fixing flange 24, six bolt insertion holes 24a are formed at equal or regular intervals in a circumferential direction of an outer peripheral portion thereof. Six bolts 25 are inserted in the bolt insertion holes 24a. The fixing flange 24 is thus interlocked with an output shaft member 27 through a thrust plate 26. The output shaft member 27 is an internal tooth of the wave gear-type speed reducer 21.

Inside the second control shaft 11, there is formed an introducing portion. The introducing portion introduces the lubricant oil which is pumped from an oil pump, not shown. The introducing portion includes an axial oil passage 64b formed inside the second control shaft 11 along an axial core direction, and an open portion 64a which is connected t with the axial oil passage 64b and fed with lubricant oil from the axial oil passage 64b. After being fed to the open portion 64a, the lubricant oil is fed to the wave gear-type speed reducer 21 described later. The open portion 64a has a shape of a circular cone whose inner diameter increases by degrees from the axial oil passage 64b side toward the wave gear-type speed reducer 21. The open portion 64a is formed at the same time as when the shaft main body 23 and the fixing flange 24 are formed by forging. Since the fixing flange 24 is formed of material used to form the open portion 64a, length of the open portion 64a from one end side to the other end side in the rotation axis direction of the control shaft is greater than thickness of the fixing flange 24. An inner diameter of the wave gear-type speed reducer 21 side of the open portion 64a is larger than an inner diameter of the axial oil passage 64b. The axial oil passage 64b has a throttle 64b1 in a connection between the axial oil passage 64b and the open portion 64a. The throttle 64b1 opens in a bottom of the open portion 64a. The throttle 64b1 has an inner diameter that is smaller than the inner diameter of the axial oil passage 64b. Inside the second control shaft 11, there is formed a plurality of radial oil passages 65a and 65b in communication with the axial oil passage 64b.

Figure 9:
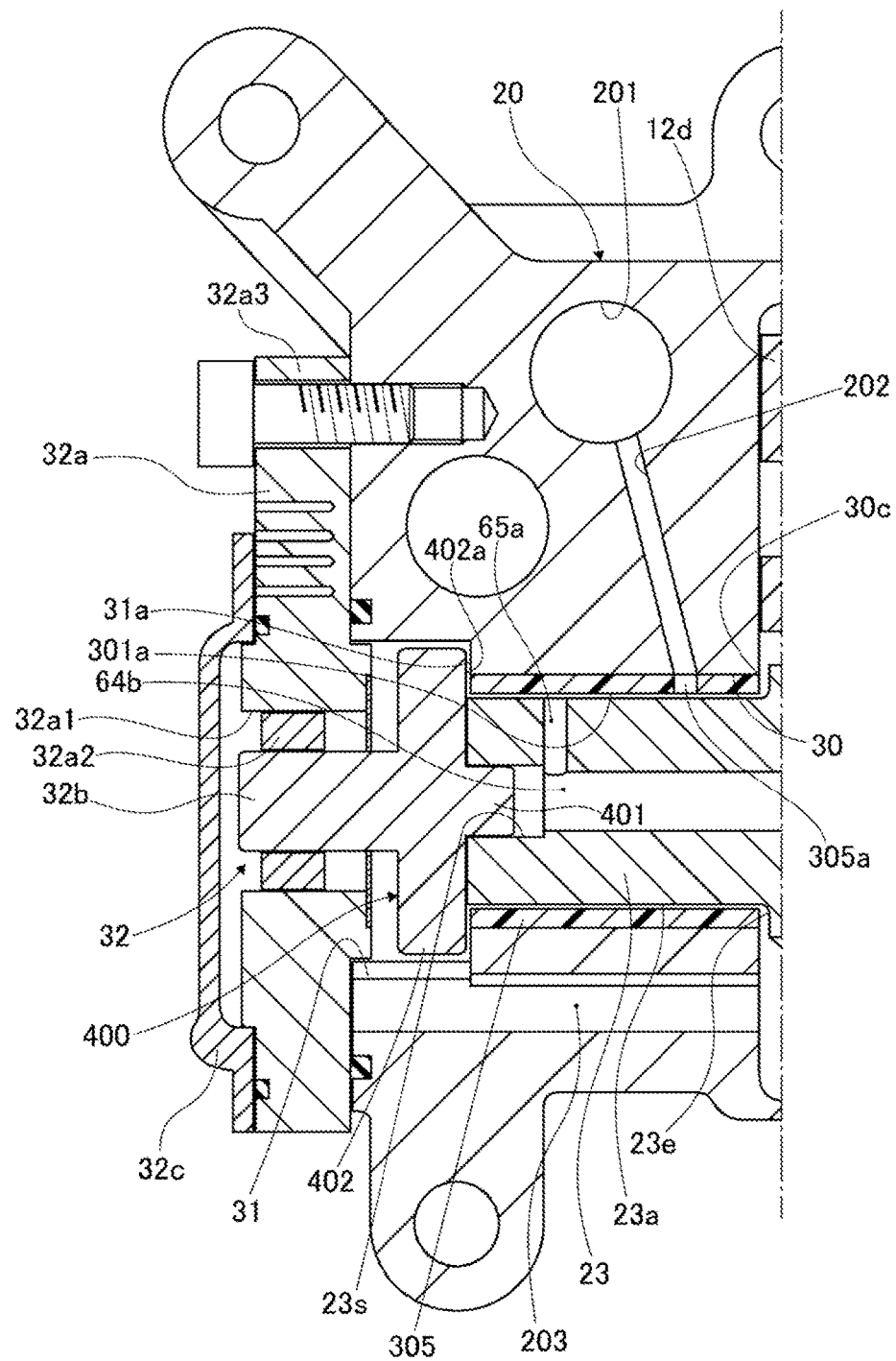
FIG. 9 is an enlarged sectional view showing an angle sensor of a link mechanism for an internal combustion engine according to the Embodiment 1 and the vicinity thereof.

A sealing member 400 for blocking the axial oil passage 64b is disposed in an opposite end portion to the open portion 64a of the axial oil passage 64b (see FIG. 9). The sealing member 400 includes a projecting sealing portion 401 which seals the end portion of the axial oil passage 64b; a substantially disc-like shielding portion 402 which shields an angle sensor 32-side end portion of the second control shaft 11; and a rotor 32b which extends toward the axial angle sensor 32 and functions as a component of the angle sensor 32 described later. The shielding portion 402 has an outer diameter which is larger than at least an inner periphery of the first bearing 305. The sealing member 400 blocks one end of the axial oil passage 64b with the sealing portion 401 secured by press-fitting in a rotor fixing hole 23s formed in the angle sensor 32-side end portion of the axial oil passage 64b. The sealing member 400 is rotated integrally with the second control shaft 11. The first bearing 305 is provided with a bearing lubrication passage 305a in a radial direction of the first bearing 305. The bearing lubrication passage 305a is in communication with a second lubrication passage 202 described later and opens closer to in the wave gear-type speed reducer 21 than the radial oil passage 65a of the second control shaft 11 does (see FIG. 9).

A radially outer side of the radial oil passage 65a opens in a clearance between an outer peripheral surface of the first journal 23a and the first bearing hole 301a and feeds lubricant oil to the first journal 23a. The radial oil passage 65b is in communication of an oil hole 65c formed in the inside of the arm link 13 and feeds lubricant oil to a gap between an inner peripheral surface of the coupling hole 13c and an outer peripheral surface of the coupling pin 14 through the oil hole 65c.

(Configuration of the Housing)

The housing 20 is made of aluminum alloy material to have a substantially cubical shape. On a rear end side of the housing 20, there is formed an open groove 20a having a large-diameter ring-like shape. The open groove 20a is blocked by the cover 28 through an O-ring 51. The cover 28 includes a motor shaft through-hole 28a pierced by the motor shaft through-hole 28a in a central position, and four bosses 28b formed by increasing diameter toward radially outer peripheries. The cover 28 and the housing 20 are fastened and secured by inserting bolts 43 into bolt insertion holes formed through the bosses 28b.

The open groove 20a is provided with one lateral face 20b in a lateral face orthogonal to an opening direction. The one lateral face 20b is an opening for the second control link 12 coupled to the arm link 13 (see FIG. 5). In the inside of the housing 20 of the one lateral face 20b, there is formed a housing chamber 29 which is an operating area of the arm link 13 and the second control link 12. Formed between the open groove 20a and the housing chamber 29 is a speed reducer-side through-hole 30b pierced by the second journal 23c of the second control shaft 11. Disposed between the second journal 23c and the speed reducer-side through-hole 30b is a second bearing 304. The support hole 30 is formed in an axial lateral face of the housing chamber 29. The support hole 30 is pierced by the first journal 23a of the second control shaft 11.

Inside the housing 20, there are a first lubrication passage 201 and a second lubrication passage 202. The first lubrication passage 201 and the second lubrication passage 202 introduce the lubricant oil which is pumped from the oil pump, not shown. The first lubrication passage 201 extends in a substantially orthogonal direction to the second control shaft 11. The second lubrication passage 202 connects the first lubrication passage 201 and the support hole 30 to each other. The support hole 30 includes a step surface 31*a* formed by increasing a diameter of an opening of the support hole 30 in a radial direction, and a sensor housing hole 31 extending from the step surface 31*a* in an axial direction (see FIG. 9). The angle sensor 32 is housed in the sensor housing hole 31. The angle sensor 32 detects a rotation angle of the rotor 32*b*, which is a rotation angle of the second control shaft 11. There is a lubricant-oil return passage 203 under the sensor housing hole 31. The lubricant-oil return passage 203 is in communication with the sensor housing hole 31 and returns lubricant oil to the housing chamber 29 side.

(Configuration of the Angle Sensor)

The angle sensor 32 includes a sensor holder 32*a* which is mounted on the housing 20 so as to block the sensor housing hole 31 from outside the housing 20. The sensor holder 32*a* includes a through-hole 32*a*1 having an inner periphery in which a detection coil 32*a*2 is disposed, and a flange 32*a*3 for securing the sensor holder 32*a* to the housing 20 with a bolt. A seal ring is disposed between the sensor holder 32*a* and the housing 20 and ensures liquid tightness between the sensor housing hole 31 and outside. On an outer periphery side of the sensor holder 32*a*, there is a sensor cover 32*c* which blocks the through-hole 32*a*1. A seal ring is disposed between the sensor cover 32*c* and the sensor holder 32*a* and ensures liquid tightness of the sensor housing hole 31 and the through-hole 32*a*1 to outside.

The rotor 32*b* of the sealing member 400 is inserted in the through-hole 32*a*1. The angle sensor 32 is a resolver sensor configured to detect a turning position of the rotor 32*b*, or the rotation angle of the second control shaft 11 by obtaining a change in preset distance between the inner periphery of the through-hole 32*a*1 and the rotor 32*b* to detect an inductance change of the detection coil 32*a*2. The angle sensor 32 outputs information about the rotation angle to a control unit, not shown, which detects an operational status of the engine.

(Configuration of the Wave Gear-Type Speed Reducer)

Figure 8:
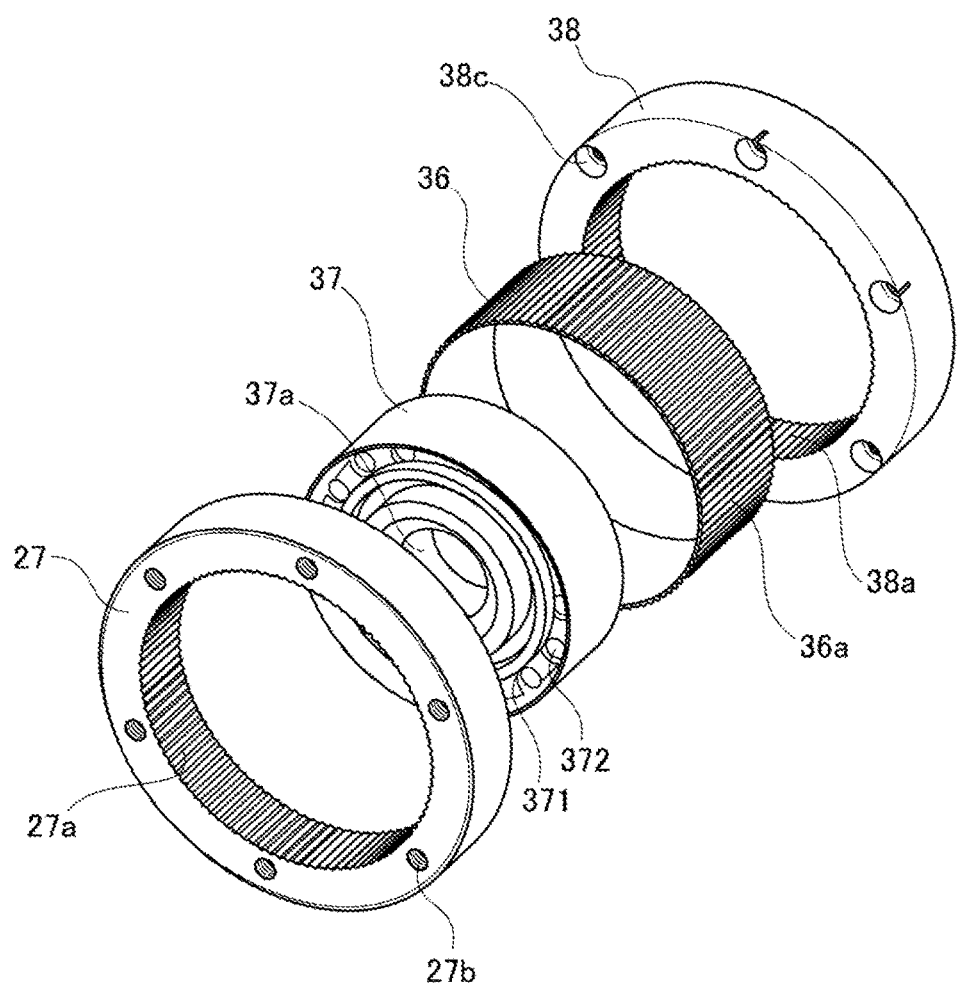
FIG. 8 is an exploded perspective view showing a wave gear-type speed reducer according to the Embodiment 1.

FIG. 8 is an exploded perspective view showing the wave gear-type speed reducer 21 according to the Embodiment 1. The wave gear-type speed reducer 21 is of a Harmonic Drive (trademark) type. The wave gear-type speed reducer 21 includes components housed in the open groove 20*a* of the housing 20 blocked by the cover 28. The wave gear-type speed reducer 21 includes the ring-like output shaft member 27 bolted to the fixing flange 24 of the second control shaft 11 and provided with a plurality of internal teeth 27*a* in an inner periphery of the output shaft member 27; an input shaft member 36 disposed on an inner diameter side of the output shaft member 27, the input shaft member 36 being flexurally deformable and having external teeth 36*a* in an outer peripheral surface, which are engaged with the internal teeth 27*a*; a wave generator 37 which is a wave generation device formed to have a shape of an ellipse and having an outer peripheral surface which slides along an inner peripheral surface of the input shaft member 36; and a fixed shaft member 38 disposed in an outer diameter side of the input shaft member 36 and having an inner peripheral surface in which internal teeth 38*a* engaged with the external teeth 36*a* are formed.

In an outer periphery side of the output shaft member 27, externally-threaded holes 27*b* which are nut portions of the bolts 25 are formed in circumferentially equally spaced positions. The input shaft member 36 is made of metal material and is a thin-wall cylindrical member which is flexurally deformable. The number of external teeth 36*a* of the input shaft member 36 is equal to the number of internal teeth 27*a* of the output shaft member 27.

The wave generator 37 includes an elliptical main body 371 and a ball bearing 372 which allows relative rotation between an outer periphery of the main body 371 and an inner periphery of the input shaft member 36. There is formed a through-hole 37*a* in the center of the main body 371. The through-hole 37*a* is provided with serrations in an inner periphery thereof. The serrations are engaged with serrations formed in an outer periphery of the other end portion 48*b* of the motor drive shaft 48 by serration connection. The connection may be key connection or spline connection, and there is no particular limitation. In a lateral face 371*a* of the main body 371, there is formed a drive motor-side cylindrical portion 371*b* which extends toward the drive motor so as to surround an outer periphery of the through-hole 37*a*. The cylindrical portion 371*b* has a cross-section having a shape of an exact circle. An outer periphery of the cylindrical portion 371*b* has a diameter smaller than a minor diameter of the main body 371 (see FIGS. 7 and 8).

The fixed shaft member 38 has an outer periphery provided with a flange 38*b* for fastening the fixed shaft member 38 to the cover 28. Six bolt insertion holes 38*c* are formed through the flange 38*b*. A second thrust plate 42 is interposed between the fixed shaft member 38 and the cover 28, and bolts 41 are inserted into the bolt insertion holes 38*c*. The fixed shaft member 38 and the second thrust plate 42 are thus fastened and secured to the cover 28. The second thrust plate 42 is made of ferrous metal having equivalent or higher wear resistance to or than the input shaft member 36. This protects the cover 28 from being abraded due to a thrust force generated in the input shaft member 36 and also regulates a rotation-axial position of a ball bearing 300 described later. The internal teeth 38*a* of the fixed shaft member 38 outnumber the external teeth 36*a* of the input shaft member 36 by two. The internal teeth 38*a* of the fixed shaft member 38 accordingly outnumber the internal teeth 27*a* of the output shaft member 27 by two. Such difference in the tooth number determines the speed-reduction ratio of the wave gear-type speed reducer, so that an extremely high speed-reduction ratio can be achieved.

(Support Structure of a Rotator)

Figure 7:
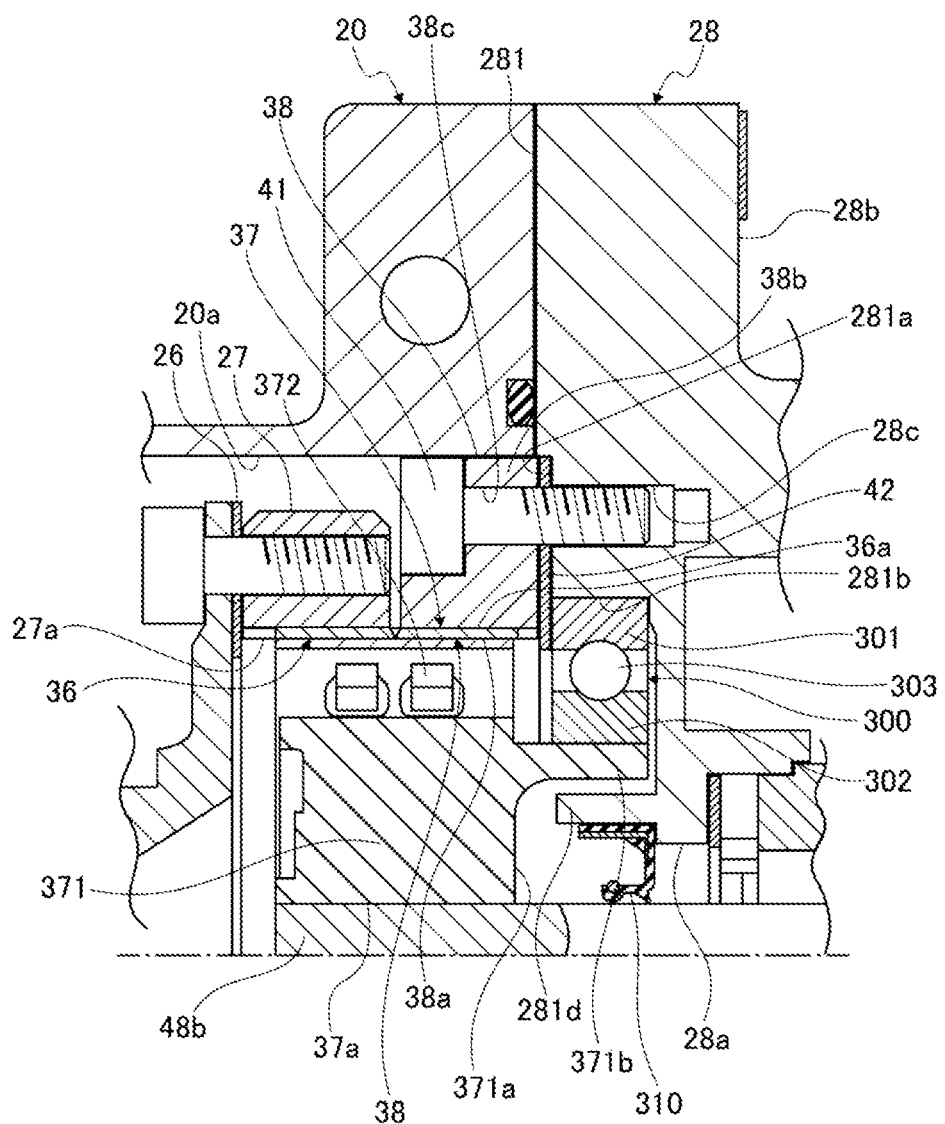
FIG. 7 is an enlarged sectional view of a connection between a housing and a cover of the actuator of a link mechanism for an internal combustion engine according to the Embodiment 1.

FIG. 7 is an enlarged sectional view of a connection between the housing 20 and the cover 28 of the actuator of a link mechanism for an internal combustion engine according to the Embodiment 1. The cover 28 has an end face 281 on the wave gear-type speed reducer 21 side. The end face 281 is provided with internal thread portions 28*c* into which the bolts 41 are screwed, a plate housing portion 281*a* which has depth substantially equal to thickness of the second thrust plate 42 and accommodates the second thrust plate 42, a bearing housing portion 281*b* which is a bottomed cylinder-like stepped portion formed so as to divert from the plate housing portion 281*a* toward the drive motor 22, and a cylindrical seal housing portion 281*d* vertically formed on an inner diameter side of the bearing housing portion 281*b*. The motor shaft through-hole 28*a* is formed on further inner-diameter side than the seal housing portion 281*d*.

An open-type ball bearing 300 is housed in the bearing housing portion 281*b*. The ball bearing 300 is a rolling bearing of a four-point contact type, which is capable of receiving a load applied in a thrust direction. The ball bearing 300 includes an outer ring 301, an inner ring 302, and a ball 303 disposed between the outer ring 301 and the inner ring 302. The ball bearing 300 has rotation-axial thickness which is substantially equal to rotation-axial depth of the bearing housing portion 281*b*. The ball bearing 300 has an outer diameter larger than an outer diameter of the ball bearing 52 pivotally supporting the motor drive shaft 48. The outer diameter of the ball bearing 300 thus ensures a sufficient capacity of the bearing. The outer ring 301 is housed in the bearing housing portion 281*b*. The outer ring 301 has an end face on the wave gear-type speed reducer 21 side, which contacts the second thrust plate 42. The outer ring 301 further has an end face on the drive motor 22 side, which contacts a bottom face 281*c*. This regulates a position of the outer ring 301 on a rotation axis of the ball bearing 300 in relation to both directions toward the wave gear-type speed reducer 21 and the drive motor 22. The bearing housing portion 281*b* is disposed on the drive motor 22 side of the wave generator 37. That is to say, the ball bearing 300 is supported in a position closer to the drive motor 22, and this inhibits or reduces deformation of the motor drive shaft 48 and inhibits or reduces increase of a rotation-axial dimension of the motor drive shaft 48 toward the second control shaft 11.

The outer ring 301 has an outer diameter larger than an inner diameter of the output shaft member 27 and an inner diameter of the fixed shaft member 38. The outer ring 301 has an inner diameter smaller than an inner diameter of the input shaft member 36. The inner ring 302 has an inner periphery to which an outer periphery side of the cylindrical portion 371*b* extending from the main body 371 of the wave generator 37 is fixed (press-fitted). The fixing here is not limited to the press-fitting but includes, for example, the fixing in which a rotation-axial position is regulated by a step and a snap ring. The motor drive shaft 48 is supported not only by the ball bearing 52 disposed between the motor casing 45 and the motor drive shaft 48, but also by the ball bearing 300 through the main body 371 and the cylindrical portion 371*b*.

(Configuration of the Sealing Portion)

On an inner diameter side of the cylindrical portion 371*b*, there is the seal housing portion 281*d* having a smaller diameter than an inner peripheral surface of the cylindrical portion 371*b*. A sealing member 310 is disposed between an inner periphery of the seal housing portion 281*d* and the outer periphery of the motor drive shaft 48. The sealing member 310 liquid-tightly seals a gap between the open groove 20*a*, in which the wave gear-type speed reducer 21 is housed, and the drive motor 22. The seal housing portion 281*d* is vertically formed on the inner diameter side of the cylindrical portion 371*b*. In short, the seal housing portion 281*d* is so formed as to be overlapped with the cylindrical portion 371*b* and the ball bearing 300 when viewed from a radial direction.

(Feeding of the Lubricant Oil)

FIG. 9 is an enlarged sectional view showing the angle sensor 32 of the link mechanism for an internal combustion engine according to the Embodiment 1 and the vicinity thereof. The lubricant oil which is fed from the first lubrication passage 201 flows through the second lubrication passage 202 and the bearing lubrication passage 305*a* to be fed to a gap between an outer periphery of the first journal 23*a* of the second control shaft 11 and the inner periphery of the first bearing 305.

The bearing lubrication passage 305*a* is formed closer to the arm link 13 than to a rotation-axial middle portion of the first bearing 305. A force is inputted to the first journal 23*a* from the arm link 13 side. In a contact face between the first journal 23*a* and the first bearing 305, a greater force acts onto the arm link 13 side, as compared to the angle sensor 32 side. The lubricant oil which is fed to the gap between the outer periphery of the first journal 23*a* of the second control shaft 11 and the inner periphery of the first bearing 305 therefore flows toward the angle sensor 32. The lubricant oil fed to the gap flows through the radial oil passages 65*a* to the axial oil passage 64*b*. Since the greater force acts onto the arm link 13 side, as compared to the angle sensor 32 side, in the contact face between the first journal 23*a* and the first bearing 305, surface pressure is higher on the arm link 13 side, as compared to the angle sensor 32 side. It is therefore possible to prevent or reduce an oil film shortage by actively feeding the lubricant oil to the arm link 13 side.

The lubricant oil which has entered the axial oil passage 64*b* is partially transferred through the radial oil passage 65*b* into the oil hole 65*c* of the arm link 13, lubricating between the inner peripheral surface of the coupling hole 13*c* and the outer peripheral surface of the coupling pin 14. The rest of the lubricant oil is increased in flow rate by the throttle 64*b*1 and dispersed within the open portion 64*a* in a spread manner, lubricating throughout the wave gear-type speed reducer 21 (see FIG. 6).

The lubricant oil fed to a gap between a lateral face of the shielding portion 402 and the stepped face 31*a* is returned to the housing chamber 29 side through the lubricant-oil return passage 203 shown in a lower part of FIG. 9.

(Operation)

The motor housing chamber which houses the drive motor 22 is configured as a dry chamber which is not fed with lubricant oil or the like. It is then required that the lubricant oil be fed to the wave gear-type speed reducer 21 from the second control shaft 11 side. One conceivable way of feeding the lubricant oil to the wave gear-type speed reducer 21 from the second control shaft 11 side is to form the axial oil passage 64*b* of the second control shaft 11. On the other side, the lubricant oil which is fed solely from the axial oil passage 64*b* merely lubricates a central portion of the wave gear-type speed reducer 21. It has been impossible to feed lubricant oil to an upper part of the wave gear-type speed reducer 21 unless the wave gear-type speed reducer 21 is being rotated. Even if the wave gear-type speed reducer 21 is in rotation, a rotation rate is not high enough to disperse the lubricant oil, so that it has been also impossible to lift the lubricant oil to the upper part of the wave gear-type speed reducer 21 and feed a sufficient amount of lubricant oil to the upper part of the wave gear-type speed reducer 21. Another conceivable way is to provide an oil passage for feeding lubricant oil, which opens in the open groove 20*a* of the housing 20, to feed the lubricant oil from a gravitationally upper side of the wave gear-type speed reducer 21. However, since the wave gear-type speed reducer 21 includes the ring-like output shaft member 27, the fixed shaft member 38, and the input shaft member 36 as the thin-wall cylindrical member, and the output shaft member 27 is secured with the fixing flange 24 of the second control shaft 11, the lubricant oil is hard to reach the inner periphery side of the output shaft member 27 and an inner periphery side of the fixed shaft member 38.

In this light, according to the Embodiment 1, the open portion 64*a* which opens to face the wave gear-type speed reducer 21 is disposed in the wave gear-type speed reducer 21 side of the axial oil passage 64*b* formed inside the second control shaft 11. In other words, the open portion 64*a* is disposed to open to face a rotation axis direction of the wave gear-type speed reducer 21. An inner diameter of the second control shaft 11 side of the open portion 64*a* is larger than an outer diameter of the second control shaft 11. This makes the lubricant oil spread within the open portion 64*a*, so that the lubricant oil can be fed through a wide area of the wave gear-type speed reducer 21.

According to the Embodiment 1, the throttle 64*b*1 is disposed in the connection of the axial oil passage 64*b* to the open portion 64*a*. Since the lubricant oil is injected into the open portion 64*a* after being increased in pressure by the throttle 64*b*1, the lubricant oil can be widely dispersed and also can be fed through the wide area of the wave gear-type speed reducer 21. The throttle 64*b*1 further causes the lubricant oil to form a flow concentrated to an axial core portion of the axial oil passage 64*b*. This flow changes into a flow spreading in the radial direction in the open portion 64*a*. The lubricant oil therefore can be widely dispersed and also can be fed through the wide area of the wave gear-type speed reducer 21.

According to the Embodiment 1, the inner diameter of the wave gear-type speed reducer 21 side of the open portion 64*a* is larger than the inner diameter of the throttle 64*b*1 of the axial oil passage 64*b*. This makes it possible to disperse the lubricant oil widely and feed the lubricant oil through the wide area of the wave gear-type speed reducer 21.

According to the Embodiment 1, the open portion 64*a* has a rotation-axial length from the wave gear-type speed reducer 21 side to the angle sensor 32 side, which is greater than the thickness of the fixing flange 24. This makes it possible to form the fixing flange 24 at the same time as when the second control shaft 11 is formed by forging, and thus improves productivity.

According to the Embodiment 1, the wave gear-type speed reducer 21 includes the output shaft member 27 connected to the fixing flange 24 of the second control shaft 11. The inner periphery of the output shaft member 27 is provided with the internal teeth 27*a*. The internal teeth 27*a* are engaged with the external teeth 36*a* of the input shaft member 36. This enables the lubricant oil to be dispersed by the open portion 64*a* and fed to an engaged portion between the internal teeth 27*a* of the output shaft member 27 and the external teeth 36*a* of the input shaft member 36.

According to the Embodiment 1, the wave gear-type speed reducer 21 includes the wave generator 37 having the ball bearing 372 inside and the input shaft member 36 disposed between the wave gear-type speed reducer 21 and the output shaft member 27. This enables the lubricant oil to be dispersed by the open portion 64*a* and fed to engaged portions in the wave gear-type speed reducer 21 and to the ball bearing 372.

According to the Embodiment 1, the link mechanism for an internal combustion engine is a variable compression ratio mechanism of an internal combustion engine, which varies stroke characteristics of the piston 1 using a double-link piston crank mechanism. This makes it possible to vary the compression ratio in accordance with the operational status of the internal combustion engine.

According to the Embodiment 1, the second control shaft 11 is integrally formed by forging, and the open portion 64*a* is formed at the same time as when the second control shaft 11 is formed by forging. This enables the open portion 64*a* to be formed without difficulty.

According to the Embodiment 1, the open portion 64*a* has a shape of a circular cone whose inner diameter increases by degrees from the axial oil passage 64*b* side toward the wave gear-type speed reducer 21. This makes it possible to disperse the lubricant oil widely and feed the lubricant oil through the wide area of the wave gear-type speed reducer 21.

According to the Embodiment 1, the axial oil passage 64*b* opens in the bottom of the other end side of the open portion 64*a*. This spreads the lubricant oil along the enlarging inner peripheral surface of the open portion 64*a*, which enables the lubricant oil to be fed through the wide area of the wave gear-type speed reducer 21.

According to the Embodiment 1, the second control shaft 11 is supported against the housing 20 using the first bearing 305 and the second bearing 304. The lubricant oil is fed from the radial oil passage 65*b* of the second control shaft 11 to the axial oil passage 64*b* through the bearing lubrication passage 305*a* formed in the first bearing 305 which is disposed in the position distant from the wave gear-type speed reducer 21. The axial oil passage 64*b* is formed to extend from the position distant from the open portion 64*a*, which makes it easy to form the oil passage connecting the axial oil passage 64*b* to the bottom of the other end side of the open portion 64*a*.

Advantageous Effects (1) There are provided the second control link 12 (control link) having the one end portion coupled to the link mechanism of an internal combustion engine; the second control shaft 11 (control shaft) configured to rotate to change the posture of the second control link 12; the wave gear-type speed reducer 21 (speed reducer) configured to reduce the rotation rate of the drive motor 22 (electric motor) and transmit the reduced rotation rate to the second control shaft 11; the axial oil passage 64*b* (oil passage) formed in the second control shaft 11 and configured to feed lubricant oil to the wave gear-type speed reducer 21; and the open portion 64*a* which opens to face the wave gear-type speed reducer 21 in one end side located on the wave gear-type speed reducer 21 side, and which is in communication with the axial oil passage 64*b* in the other end side. The inner diameter of the one end side of the open portion 64*a* is larger than the outer diameter of the one end side of the axial oil passage 64*b*.

Therefore, the lubricant oil is spread within the open portion 64*a*, which makes it possible to feed the lubricant oil through the wide area of the wave gear-type speed reducer 21.

(2) The axial oil passage 64*b* has the throttle 64*b*1 in the connection between the open portion 64*a* and the axial oil passage 64*b*.

Therefore, the lubricant oil is injected into the open portion 64*a* after being increased in pressure by the throttle 64*b*1, which makes it possible to widely disperse the lubricant oil and feed the lubricant oil through the wide area of the wave gear-type speed reducer 21.

(3) The inner diameter of the one end side of the open portion 64*a* is larger than the inner diameter of the throttle 64*b*1.

Therefore, the lubricant oil is spread within the open portion 64*a*, which makes it possible to widely disperse the lubricant oil and feed the lubricant oil through the wide area of the wave gear-type speed reducer 21.

(4) The second control shaft 11 includes the fixing flange 24 (flange) on the one end side, which is connected to the wave gear-type speed reducer 21. The length of the open portion 64*a* from the one end side to the other end side in the rotation axis direction of the control shaft is greater than the thickness of the fixing flange 24.

Therefore, the fixing flange 24 can be formed at the same time as when the second control shaft 11 is formed by forging, which makes it possible to improve productivity.

(5) The wave gear-type speed reducer 21 includes the ring-like output shaft member 27 (output member) connected to the fixing flange 24 of the second control shaft 11. The output shaft member 27 has the inner periphery provided with a gear engagement portion.

It is therefore possible to disperse the lubricant oil by the open portion 64a and thus feed the lubricant oil to the engaged portion between the internal teeth 27a of the output shaft member 27 and the external teeth 36a of the input shaft member 36.

(6) The wave gear-type speed reducer 21 includes the wave generator 37 (wave generation device) connected to the motor drive shaft 48 (output shaft) of the drive motor 22 and having the ball bearing 372 (ball bearing) inside, and the input shaft member 36 (flexible gear) disposed between the wave generator 37 and the output shaft member 27.

It is therefore possible to disperse the lubricant oil by the open portion 64a and thus feed the lubricant oil to the engaged portions in the wave gear-type speed reducer 21 and to the ball bearing 372.

(7) The link mechanism for an internal combustion engine is configured as the variable compression ratio mechanism of an internal combustion engine, which varies the stroke characteristics of the piston using the double-link piston crank mechanism.

It is therefore possible to vary the compression ratio in accordance with the operational status of the internal combustion engine.

(8) The second control shaft 11 is integrally formed by forging, and the open portion 64a is formed at the same time as when the second control shaft 11 is formed by forging.

It is therefore possible to form the open portion 64a without difficulty.

(9) The open portion 64a has an inner peripheral surface having a shape of a circular cone whose inner diameter increases from the other end side toward the one end side in the rotation axis direction of the second control shaft 11.

It is therefore possible to widely disperse the lubricant oil and thus feed the lubricant oil through the wide area of the wave gear-type speed reducer 21.

(10) The axial oil passage 64b opens in the bottom of the other end side of the open portion 64a.

Therefore, the lubricant oil is spread along the broadened inner peripheral surface of the open portion 64a, which makes it possible to feed the lubricant oil through the wide area of the wave gear-type speed reducer 21.

(11) The second control shaft 11 is supported against the housing 20 using two bearings, namely, the first bearing 305 and the second bearing 304. The lubricant oil is fed into the axial oil passage 64b from outside the second control shaft 11 at the position of the first bearing 305 of the two bearings, which is located farther from the speed reducer than the second bearing 304.

Since the axial oil passage 64b is formed to extend from the position distant from the open portion 64a, it is possible to make it easy to form the oil passage connecting the axial oil passage 64b to the bottom of the other end side of the open portion 64a.

(12) There are provided the second control shaft 11 (control shaft) configured to rotate to vary the characteristics of the variable compression ratio mechanism of an internal combustion engine; the wave gear-type speed reducer 21 (speed reducer) configured to reduce and transmit the rotation rate of the drive motor 22 (electric motor) to the second control shaft 11; the axial oil passage 64b formed in the second control shaft 11 and configured to feed the lubricant oil to the wave gear-type speed reducer 21; and the open portion 64a which opens to face the wave gear-type speed reducer 21 in the one end side located on the wave gear-type speed reducer 21 side, and which is in communication with the axial oil passage 64b in the other end side. The inner diameter of the one end side of the open portion 64a is larger than the outer diameter of the second control shaft 11.

Therefore, the lubricant oil is spread within the open portion 64a, which makes it possible to feed the lubricant oil through the wide area of the wave gear-type speed reducer 21.

(13) The axial oil passage 64b has the throttle 64b1 (reduced-diameter portion) in the connection between the open portion 64a and the axial oil passage 64b.

Therefore, the lubricant oil is injected into the open portion 64a after being increased in pressure by the throttle 64b1, which makes it possible to widely disperse the lubricant oil and thus feed the lubricant oil through the wide area of the wave gear-type speed reducer 21.

(14) The inner diameter of the one end side of the open portion 64a is formed larger than the inner diameter of the throttle 64b1.

Therefore, the lubricant oil is spread within the open portion 64a, which makes it possible to widely disperse the lubricant oil and thus feed the lubricant oil through the wide area of the wave gear-type speed reducer 21.

(15) There are provided the second control link 12 (control link) having the one end portion connected to the link mechanism of an internal combustion engine;

the second control shaft 11 (control shaft) configured to rotate to change the posture of the second control link 12; the wave gear-type speed reducer 21 (speed reducer) configured to reduce and transmit the rotation rate of the drive motor 22 (electric motor) to the control shaft; the axial oil passage 64b formed in the second control shaft 11 and configured to feed the lubricant oil to the wave gear-type speed reducer 21; and the open portion 64a which opens to face the wave gear-type speed reducer 21 in the rotation axis direction of the wave gear-type speed reducer 21 in the one end side located on the wave gear-type speed reducer 21 side, and which is in communication with the axial oil passage 64b in the other end side.

Therefore, the lubricant oil is fed from the rotation axis direction of the wave gear-type speed reducer 21, which makes it easier to feed the lubricant oil to the constituent elements of the wave gear-type speed reducer 21, including the output shaft member 27, a gap between the fixed shaft member 38 and the input shaft member 36, the wave generator 37, etc., as compared to a case where the lubricant oil is fed from radially outside the wave gear-type speed reducer. It is therefore possible to feed the lubricant oil through the wide area of the wave gear-type speed reducer 21.

Embodiment 2

According to an Embodiment 2, there is provided a guide member 500 configured to guide lubricant oil within an open portion 64a. The same constituent elements as those of the Embodiment 1 will be provided with the same reference marks, and descriptions thereof will be omitted.

Figure 10:
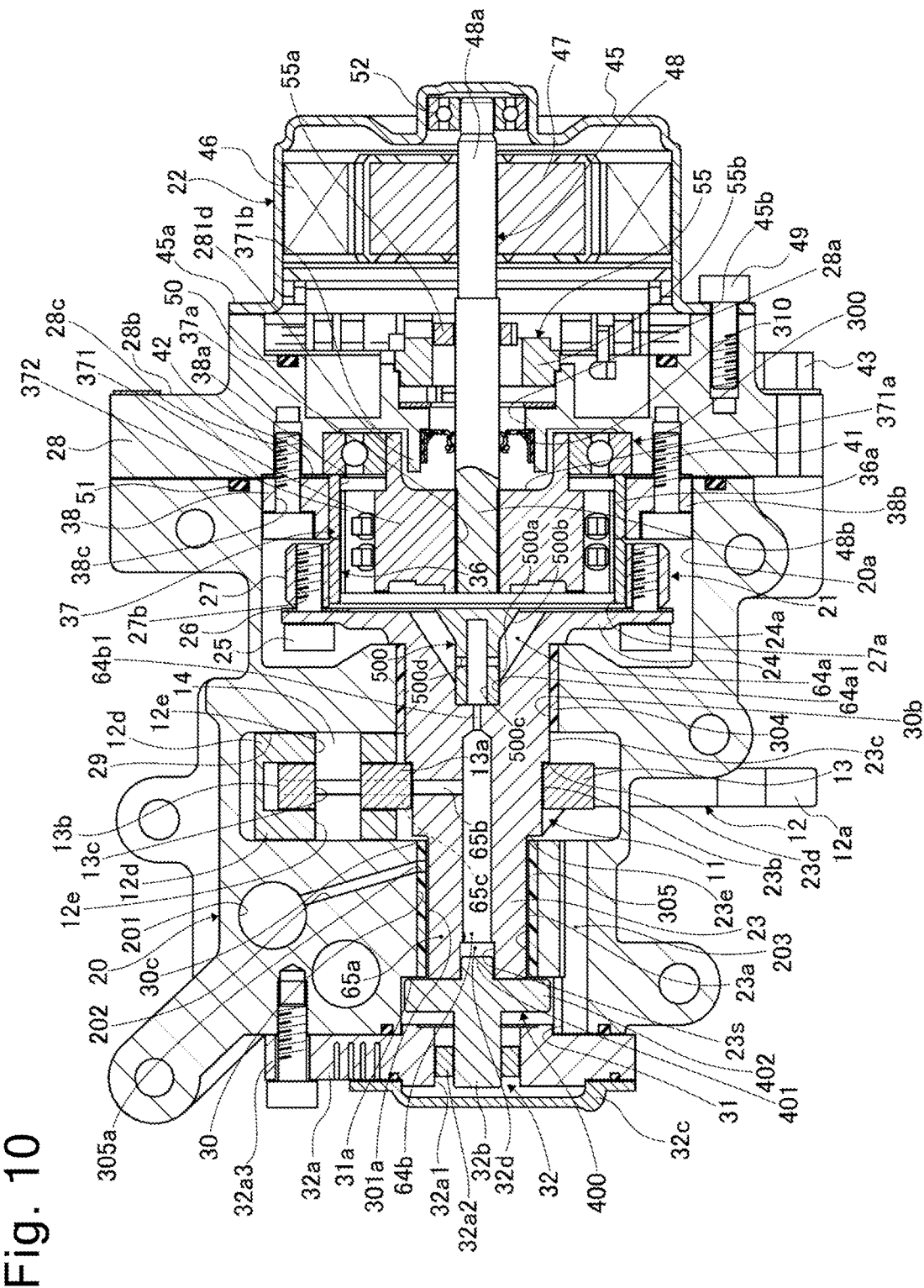
FIG. 10 is a sectional view of an actuator of a link mechanism for an internal combustion engine according to an Embodiment 2.

FIG. 10 is a sectional view of an actuator of a link mechanism for an internal combustion engine. There is provided the guide member 500 configured to guide the lubrication oil within the open portion 64a. The guide member 500 is formed of a separate member from a second control shaft 11. The guide member 500 includes a cylindrical portion 500a formed in a cylindrical shape, and a conical portion 500b formed integrally on one end side of the cylindrical portion 500a and having an outer diameter in a circular cone shape. The cylindrical portion 500a has an outer diameter larger than an inner diameter of an axial oil passage 64b of the second control shaft 11. The open portion 64a includes a bottom provided with an insertion portion 64a1 into which the cylindrical portion 500a is inserted.

An axial oil passage 500c is formed to axially extend from the other end side of the cylindrical portion 500a through an axial core of the cylindrical portion 500a. The axial oil passage 500c opens in a lateral face of the other end side of the cylindrical portion 500a. The axial oil passage 500c has one end side which reaches halfway of the conical portion 500b. A radial oil passage 500d is formed, which opens in an outer peripheral surface of the cylindrical portion 500a and is in communication with the axial oil passage 500c.

[Operation]

The lubricant oil injected from a throttle 64b1 flows into the axial oil passage 500c of the guide member 500 to be sent through the radial oil passage 500d into the open portion 64a. The lubricant oil sent into the open portion 64a flows along a gap between an inner periphery of the open portion 64a and an outer periphery of the conical portion 500b to be fed to a wave gear-type speed reducer 21.

Advantageous Effects

(16) The open portion 64a is provided with the guide member 500 configured to guide lubricant oil to an inner periphery side of the open portion 64a and yet further outside than the inner diameter of the axial oil passage 64b.

Since the lubricant oil is guided by the guide member 500 further outside than the inner diameter of the axial oil passage 64b within the open portion 64a, it is possible to feed the lubricant oil through a wide area of the wave gear-type speed reducer 21.

Embodiment 3

An Embodiment 3 includes an open portion 64a altered in shape from the open portion 64a of the Embodiment 1. The same constituent elements as those of the Embodiment 1 will be provided with the same reference marks, and descriptions thereof will be omitted.

Figure 11:
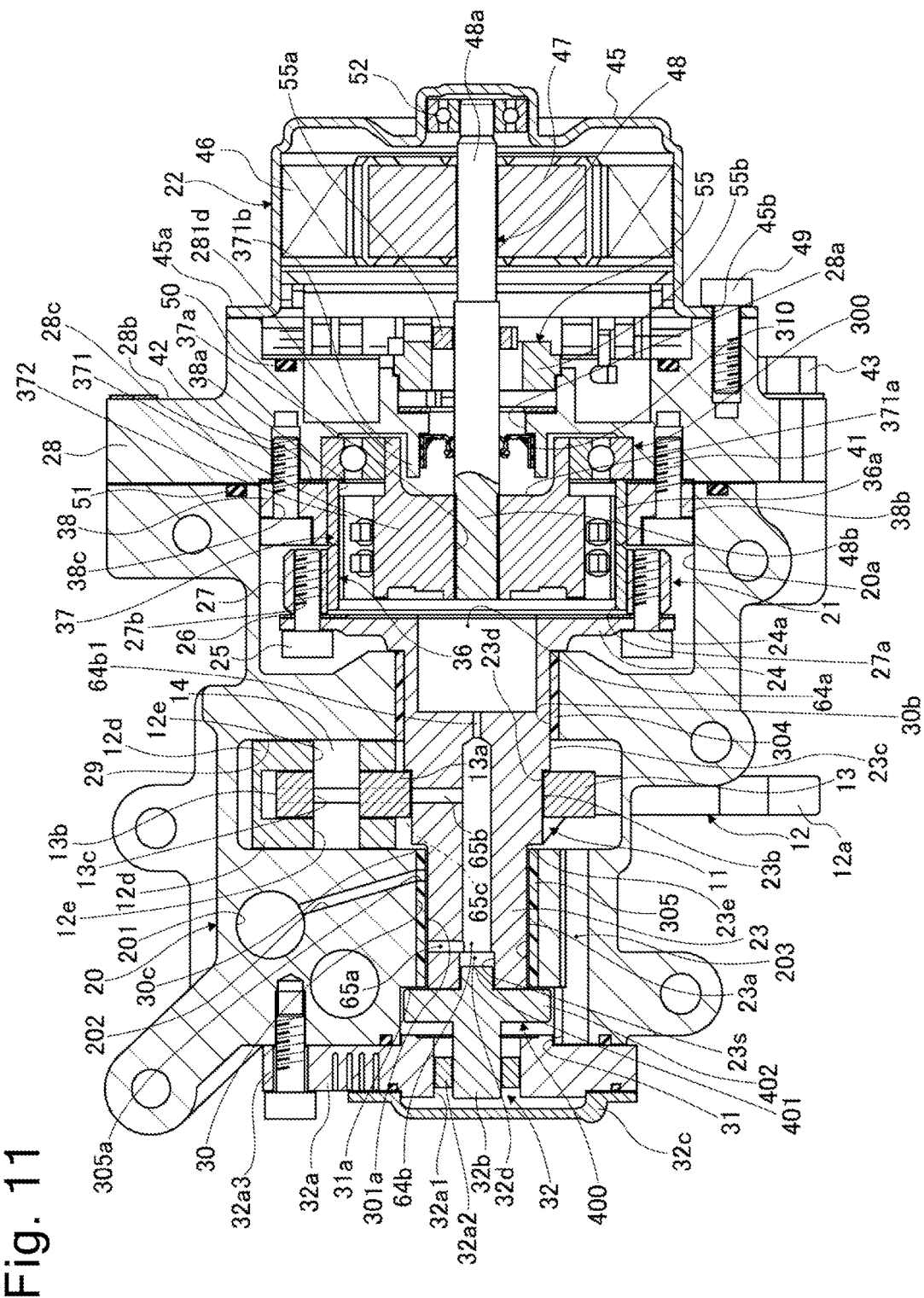
FIG. 11 is a sectional view of an actuator of a link mechanism for an internal combustion engine according to an Embodiment 3.

FIG. 11 is a sectional view of an actuator of a link mechanism for an internal combustion engine. The open portion 64a is formed into a shape of a cylinder with an inner diameter larger than an inner diameter of an axial oil passage 64b.

Advantageous Effects

(17) The open portion 64a has an inner peripheral surface formed into a columnar shape.

It is therefore possible to widely disperse lubricant oil and thus feed the lubricant oil through a wide area of a wave gear-type speed reducer 21. It is also possible to make it easy to form the open portion 64a.

Embodiment 4

An Embodiment 4 includes an open portion 64a altered in shape from the open portion 64a of the Embodiment 1. The same constituent elements as those of the Embodiment 1 will be provided with the same reference marks, and descriptions thereof will be omitted.

Figure 12:
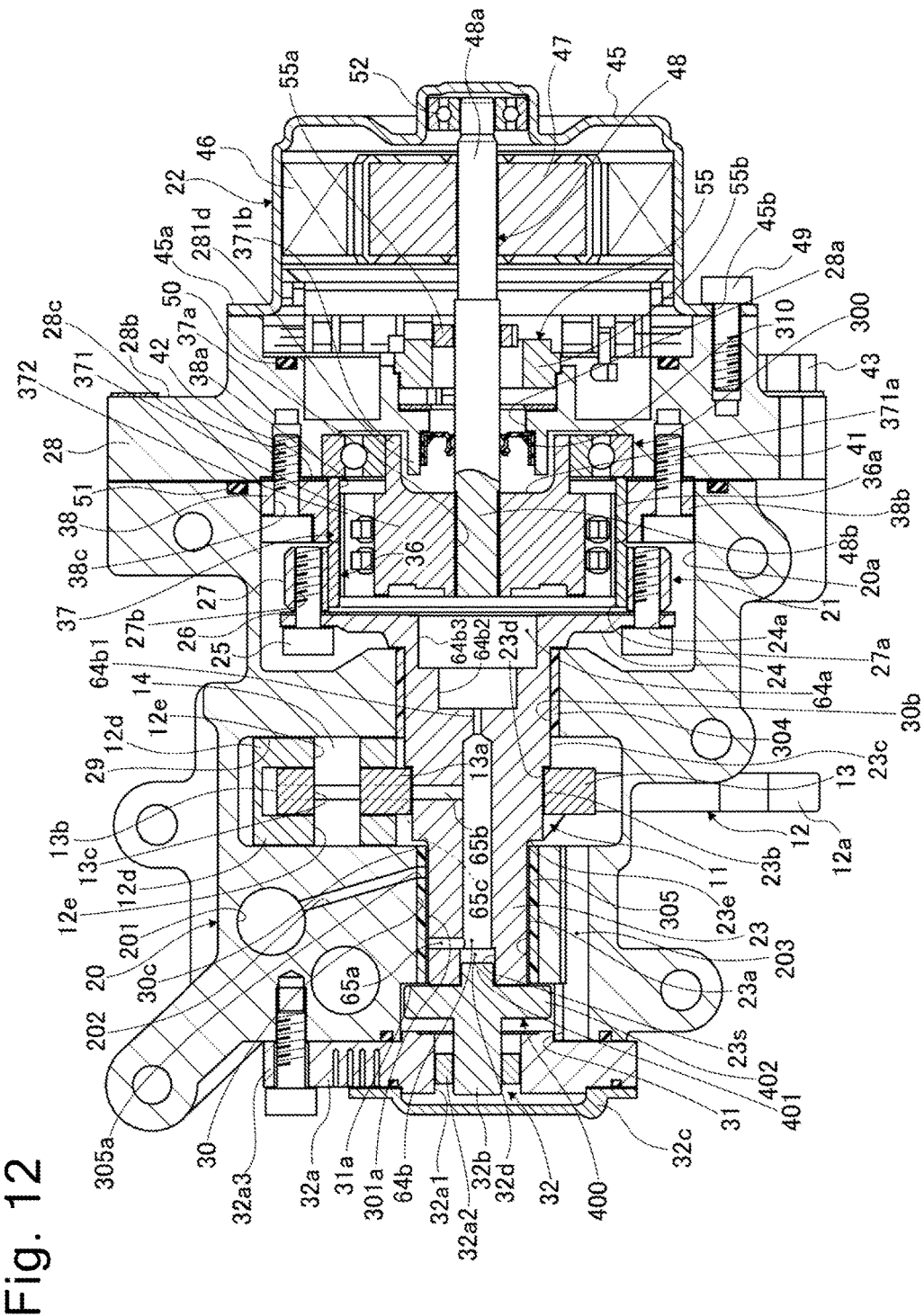
FIG. 12 is a sectional view of an actuator of a link mechanism for an internal combustion engine according to an Embodiment 4.

FIG. 12 is a sectional view of an actuator of a link mechanism for an internal combustion engine. The open portion 64a includes a small-diameter portion 64a2 formed on an axial oil passage 64b side and a large-diameter portion 64a3 formed on a wave gear-type speed reducer 21 side. The small-diameter portion 64a2 is formed into a shape of a cylinder with an inner diameter larger than an inner diameter of the axial oil passage 64b. The large-diameter portion 64a3 is formed into a shape of a cylinder with an inner diameter larger than an inner diameter of the small-diameter portion 64a2.

Advantageous Effects

(18) The open portion 64a has an inner peripheral surface which is formed so that an inner diameter increases in a step-like pattern from the other end side toward one end side in a rotation axis direction of a second control shaft 11.

It is therefore possible to widely disperse lubricant oil and thus feed the lubricant oil through a wide area of the wave gear-type speed reducer 21. It is also possible to make it easy to form the open portion 64a.

Embodiment 5

An Embodiment 5 includes an open portion 64a altered in shape from the open portion 64a of the Embodiment 1. The same constituent elements as those of the Embodiment 1 will be provided with the same reference marks, and descriptions thereof will be omitted.

Figure 13:
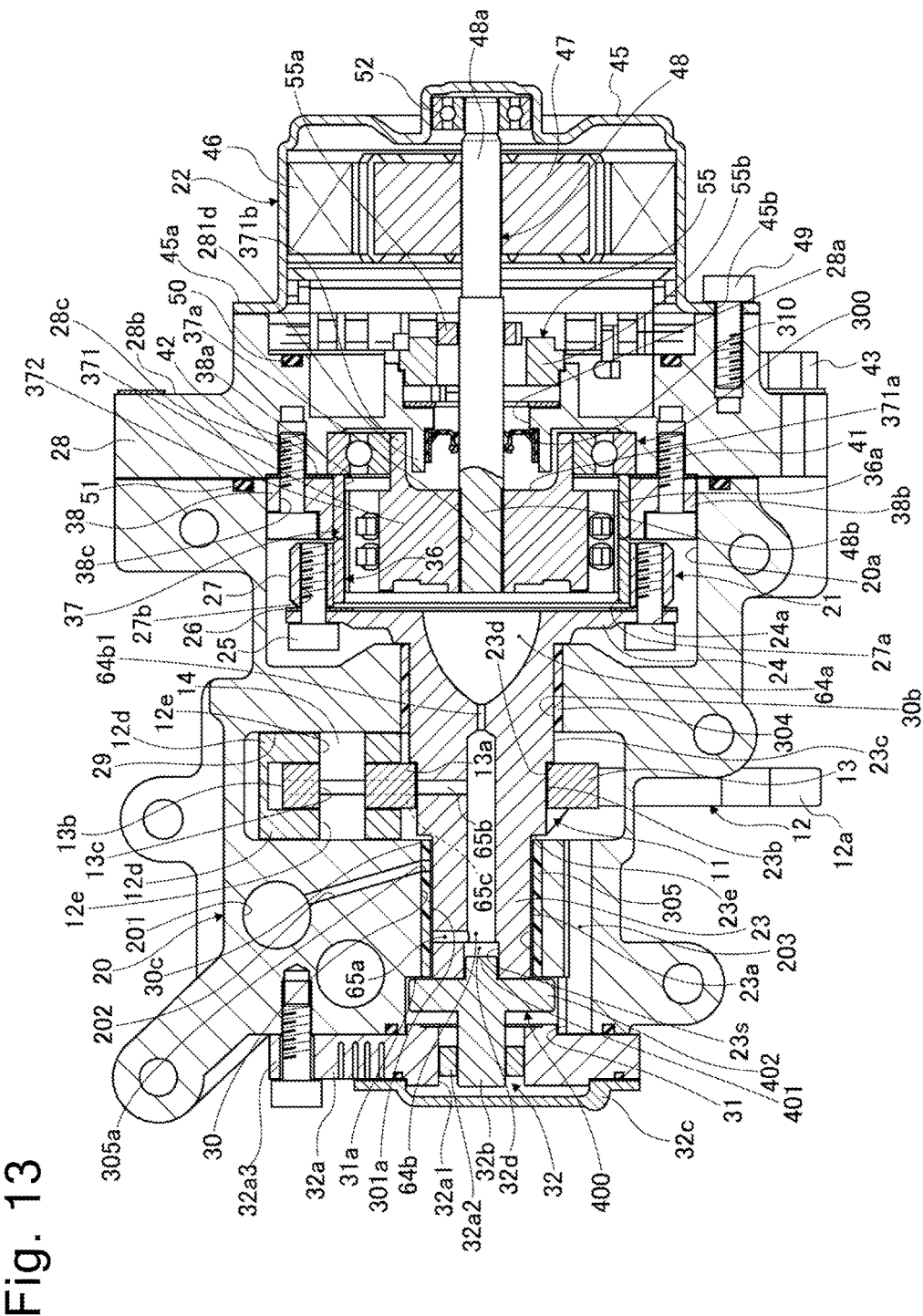
FIG. 13 is a sectional view of an actuator of a link mechanism for an internal combustion engine according to an Embodiment 5.

FIG. 13 is a sectional view of an actuator of a link mechanism for an internal combustion engine. The open portion 64a increases in inner diameter by degrees from an axial oil passage 64b side toward a wave gear-type speed reducer 21. However, a rotation-axial section of the open portion 64a has a shape of a curved surface, instead of the conical shape as in the Embodiment 1.

Advantageous Effects

(19) The open portion 64a has an inner peripheral surface which is formed so that an inner diameter increases from the other end side toward the one end side in a rotation axis direction of a second control shaft 11.

It is therefore possible to widely disperse lubricant oil and thus feed the lubricant oil through a wide area of the wave gear-type speed reducer 21.

Embodiment 6

An Embodiment 6 includes an oil passage in communication with an open portion 64a, which is altered in its open position from the oil passage of the Embodiment 1. The same constituent elements as those of the Embodiment 1 will be provided with the same reference marks, and descriptions thereof will be omitted.

Figure 14:
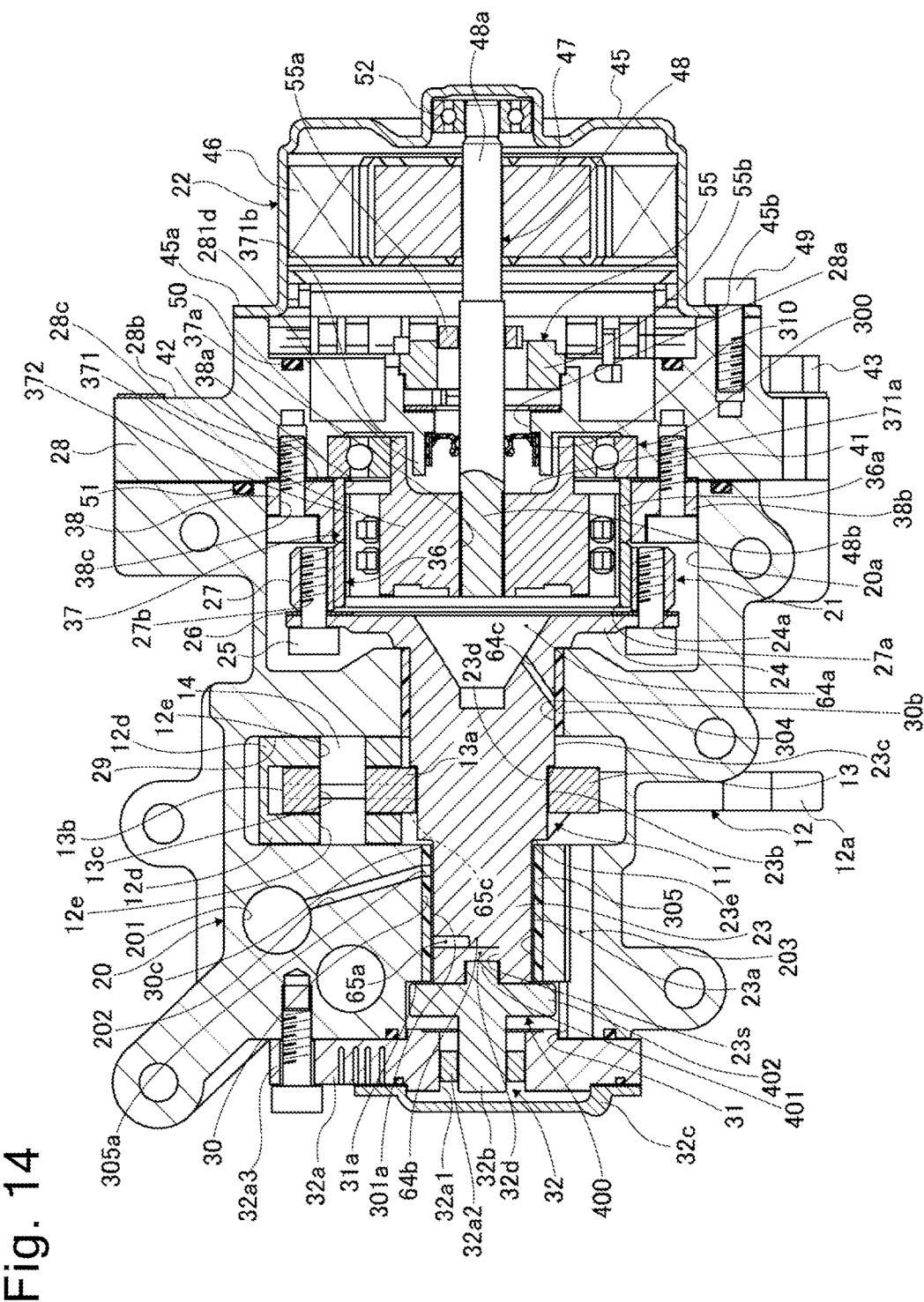
FIG. 14 is a sectional view of an actuator of a link mechanism for an internal combustion engine according to an Embodiment 6.

FIG. 14 is a sectional view of an actuator of a link mechanism for an internal combustion engine. The Embodiment 6 includes a diagonal oil passage 64c, instead of the axial oil passage 64b. The diagonal oil passage 64c opens in an inner peripheral surface of the open portion 64a and in a position between the other end side and the one end side in a rotation axis direction of the open portion 64a. The diagonal oil passage 64c is formed so that an axial direction thereof extends toward an upper part of a wave gear-type speed reducer 21.

Advantageous Effects

(20) The open portion 64*a* has an inner peripheral surface which is formed so that an inner diameter increases from the other end side toward the one end side in a rotation axis direction of a second control shaft 11. The diagonal oil passage 64*c* opens in a position between the other end side portion and the one end side portion in the rotation axis direction of the second control shaft 11 in the inner peripheral surface of the open portion 64*a*.

It is therefore possible to widely disperse lubricant oil and thus feed the lubricant oil through a wide area of the wave gear-type speed reducer 21.

Another Embodiment

The invention has been discussed on the basis of the Embodiments 1 to 3. However, the intention of the Embodiments 1 to 3 is not to limit specific configurations of the invention. The invention may be modified and improved without deviating from its gist, and its equivalents are included in the invention.

For example, although the Embodiment 1 employs the above-discussed actuator of a link mechanism for an internal combustion engine as a mechanism which varies the compression ratio of an internal combustion engine, it is also possible to employ the above-discussed actuator in the link mechanism of the variable valve apparatus of an internal combustion engine, which varies the operating characteristics of an intake valve and an exhaust valve, as in Japanese Unexamined Patent Application Publication (Kokai) No. 2009-150244.

[Technical Ideas Other than the Claims]

The embodiments of the invention may be configured as below.

(A) The actuator of a link mechanism for an internal combustion engine according to claim 4, wherein the speed reducer includes a ring-like output member connected to the flange of the control shaft; and wherein the output shaft has an inner periphery provided with a gear engagement portion.

(B) The actuator of a link mechanism for an internal combustion engine according to (A), wherein the speed reducer is a wave gear-type speed reducer; and wherein the speed reducer includes a wave generation device which is connected to an output shaft of the electric motor and includes a ball bearing inside, and a flexible gear disposed between the wave generation device and the output member.

(C) The actuator of a link mechanism for an internal combustion engine according to (A), wherein the link mechanism for an internal combustion engine is a variable compression ratio mechanism of an internal combustion engine, which varies stroke characteristics of a piston using a double-link piston crank mechanism.

(D) The actuator of a link mechanism for an internal combustion engine according to claim 4, wherein the control shaft is integrally formed by forging, and the open portion is formed at the same time as when the control shaft is formed by forging.

(E) The actuator of a link mechanism for an internal combustion engine according to claim 5, wherein the oil passage opens in a bottom of the other end side of the open portion.

(F) The actuator of a link mechanism for an internal combustion engine according to (E), wherein the control shaft is supported against the housing by two bearings, and lubricant oil is fed into the oil passage from outside the control shaft at a position of one of the two bearings, which is located farther from the speed reducer than the other.

(G) The actuator of a link mechanism for an internal combustion engine according to claim 3, wherein the open portion includes a guide member configured to guide the lubricant oil to an inner periphery side of the open portion and yet further outside than an inner diameter of the oil passage.

(H) The actuator of a link mechanism for an internal combustion engine according to claim 3, wherein the open portion has an inner peripheral surface which is formed into a columnar shape.

(I) The actuator of a link mechanism for an internal combustion engine according to claim 3, wherein the open portion has an inner peripheral surface which is formed so that an inner diameter increases in a step-like pattern from the other end side toward the one end side in a rotation axis direction of the control shaft.

(J) The actuator of a link mechanism for an internal combustion engine according to claim 3, wherein the open portion has an inner peripheral surface which is formed so that an inner diameter increases from the other end side toward the one end side in a rotation axis direction of the control shaft, and wherein the oil passage opens between the other end portion and one end portion in a rotation axis direction of the control shaft in an inner peripheral surface of the open portion.

(K) The actuator of a link mechanism for an internal combustion engine according to claim 8, wherein the control shaft includes a flange on one end side, which is connected to the speed reducer, and wherein length of the open portion from the one end side to the other end side in the rotation axis direction of the control shaft is greater than thickness of the flange.

The invention may be configured as below.

(1) An actuator of a link mechanism for an internal combustion engine, comprising:

a control shaft configured to rotate to change a posture of a link mechanism of an internal combustion engine;

a speed reducer configured to reduce a rotation rate of an electric motor and transmit the reduced rotation rate to the control shaft;

an oil passage formed inside the control shaft; and an open portion which opens to face the speed reducer in one end side located on the speed reducer side, and which is in communication with the oil passage in the other end side, wherein an inner diameter of the one end side of the open portion is larger than an outer diameter of one end side of the oil passage.

(2) The actuator of a link mechanism for an internal combustion engine according to (1), wherein the oil passage may include a throttle in a connection between the open portion and the oil passage.

(3) The actuator of a link mechanism for an internal combustion engine according to (2), wherein an inner diameter of the one end side of the open portion may be larger than an inner diameter of the throttle.

(4) The actuator of a link mechanism for an internal combustion engine according to (3), wherein the control shaft may include a flange on one end side, which is connected to the speed reducer, and wherein length of the open portion from the one end side to the other end side in a rotation axis direction of the control shaft may be greater than thickness of the flange.

(5) The actuator of a link mechanism for an internal combustion engine according to (4), wherein the speed reducer may include a ring-like output member which is connected to the flange of the control shaft; and wherein the output shaft may have an inner periphery provided with a gear engagement portion.

(6) The actuator of a link mechanism for an internal combustion engine according to (5), wherein the speed reducer may be a wave gear-type speed reducer, and wherein the speed reducer may include a wave generation device which is connected to an output shaft of the electric motor and includes a ball bearing inside, and a flexible gear disposed between the wave generation device and the output member.

(7) The actuator of a link mechanism for an internal combustion engine according to (5), wherein the link mechanism for an internal combustion engine may be a variable compression ratio mechanism of an internal combustion engine, which is configured to vary stroke characteristics of a piston using a double-link piston crank mechanism.

(8) The actuator of a link mechanism for an internal combustion engine according to (4), wherein the actuator may be so configured that the control shaft is integrally formed by forging, and that the open portion is formed at the same time as when the control shaft is formed by forging.

(9) The actuator of a link mechanism for an internal combustion engine according to (3), wherein the open portion may have an inner peripheral surface having a shape of a circular cone whose inner diameter increases from an axial oil passage side toward the one end side in a rotation axis direction of the control shaft.

(10) The actuator of a link mechanism for an internal combustion engine according to (9), wherein the oil passage may open in a bottom of the other end side of the open portion.

(11) The actuator of a link mechanism for an internal combustion engine according to (10), wherein the control shaft may be supported against the housing by two bearings, and lubricant oil may be fed into the oil passage from outside the control shaft at a position of one of the two bearings, which is located farther from the speed reducer than the other.

(12) The actuator of a link mechanism for an internal combustion engine according to (3), wherein the open portion includes a guide member configured to guide the lubricant oil to an inner periphery side of the open portion and yet further outside than an inner diameter of the oil passage.

(13) The actuator of a link mechanism for an internal combustion engine according to (3), wherein the open portion may have an inner peripheral surface which is formed into a columnar shape.

(14) The actuator of a link mechanism for an internal combustion engine according to (3), wherein the open portion may have an inner peripheral surface which is formed so that an inner diameter increases in a step-like pattern from the other end side toward the one end side in a rotation axis direction of the control shaft.

(15) The actuator of a link mechanism for an internal combustion engine according to (3), wherein the open portion may have an inner peripheral surface which is formed so that an inner diameter increases from the other end side toward the one end side in a rotation axis direction of the control shaft; and wherein the oil passage may open between the other end side and the one end side in a rotation axis direction of the control shaft in an inner peripheral surface of the open portion.

(16) An actuator of a variable compression ratio mechanism of an internal combustion engine, comprising:

a control shaft configured to rotate to vary characteristics of a variable compression ratio of an internal combustion engine;

a speed reducer configured to reduce and transmit a rotation rate of an electric motor to the control shaft;

an oil passage formed inside the control shaft; and an open portion which opens to face the speed reducer in one end side located on the speed reducer side, and which is in communication with the oil passage in the other end side, wherein an inner diameter of the one end side of the open portion is larger than an outer diameter of the control shaft.

(17) The actuator of a variable compression ratio mechanism of an internal combustion engine according to (16), wherein the oil passage may include a reduced-diameter portion in a connection between the open portion and the oil passage.

(18) The actuator of a variable compression ratio mechanism of an internal combustion engine according to (17), wherein the inner diameter of the one end side of the open portion may be larger than an inner diameter of the reduced-diameter portion.

(19) The actuator of a variable compression ratio mechanism of an internal combustion engine according to (18), wherein the control shaft may include a flange on one end side, which is connected to the speed reducer, and wherein length of the open portion from the one end side to the other end side in a rotation axis direction of the control shaft may be greater than thickness of the flange.

(20) An actuator of a link mechanism for an internal combustion engine, which may comprise:

a control shaft configured to rotate to change a posture of a link mechanism of an internal combustion engine;

a speed reducer configured to reduce and transmit a rotation rate of an electric motor to the control shaft;

an oil passage formed inside the control shaft; and an open portion which opens to face the speed reducer in a rotation axis direction of the speed reducer in one end side located on the speed reducer side, and which is in communication with the oil passage in the other end side.

The invention has been discussed on the basis of only a few embodiments. One skilled in the art should easily understand that the exemplary embodiments may be modified or improved in various ways without materially departing from the novel teachings and advantages of the invention. Accordingly, all such modifications and improvement are intended to be included within the technical scope of the invention. The embodiments may be combined in any ways.

The present application claims priority under Japanese Patent Application No. 2015-152661 filed on Jul. 31, 2015. The entire disclosure of Japanese Patent Application No. 2015-152661 filed on Jul. 31, 2015, including the description, claims, drawings and abstract, is incorporated herein by reference in its entirety.

REFERENCE SIGNS LIST

11 second control shaft (control shaft)
12 second control link (control link)

21 wave gear-type speed reducer (speed reducer)
22 drive motor (electric motor)
24 fixing flange (flange)
27 output shaft member (output member)
36 input shaft member (flexible gear)
37 wave generator (wave generation device)
48 motor drive shaft (output shaft)
64a open portion 64b
64b axial oil passage (oil passage)
64b1 throttle (reduced-diameter portion)
301 first bearing
304 second bearing
372 ball bearing (ball bearing)
500 guide member

The invention claimed is:

1. An actuator of a link mechanism for an internal combustion engine, comprising:
   a control shaft configured to rotate to change a posture of the link mechanism of the internal combustion engine;
   a speed reducer configured to reduce a rotation rate of an electric motor and transmit the reduced rotation rate to the control shaft;
   an oil passage formed inside the control shaft; and
   an open portion which opens to face the speed reducer at one end side located on a side of the speed reducer, and which is in communication with the oil passage at another end side of the open portion,
   wherein an inner diameter of the one end side of the open portion is larger than an inner diameter of one end side of the oil passage,
   wherein the control shaft includes a flange on one end side, which is connected to the speed reducer, and
   wherein a length of the open portion from the one end side of the open portion to the another end side of the open portion in a rotation axis direction of the control shaft is greater than a thickness of the flange.

2. The actuator of a link mechanism for an internal combustion engine according to claim 1,
   wherein the speed reducer includes a ring-like output member which is connected to the flange of the control shaft, and
   wherein the output member has an inner periphery provided with a gear engagement portion.

3. The actuator of a link mechanism for an internal combustion engine according to claim 2,
   wherein the speed reducer is a wave gear-type speed reducer, and
   wherein the speed reducer comprises a wave generator which is connected to an output shaft of the electric motor and includes a ball bearing inside, and a flexible gear disposed between the wave generator and the output member.

4. The actuator of a link mechanism for an internal combustion engine according to claim 2,
   wherein the link mechanism for the internal combustion engine is a variable compression ratio mechanism of the internal combustion engine, which is configured to vary stroke characteristics of a piston using a double-link piston crank mechanism.

5. The actuator of a link mechanism for an internal combustion engine according to claim 1,
   wherein the control shaft is integrally formed by forging, and the open portion is formed when the control shaft is formed by forging.

6. The actuator of a link mechanism for an internal combustion engine according to claim 1,
   wherein the open portion has an inner peripheral surface having a shape of a cone, and the inner diameter of the open portion increases from the another end side of the open portion toward the one end side of the open portion in the rotation axis direction of the control shaft.

7. The actuator of a link mechanism for an internal combustion engine according to claim 6,
   wherein the oil passage opens to a bottom of the another end side of the open portion.

8. The actuator of a link mechanism for an internal combustion engine according to claim 7,
   wherein the control shaft is supported against a housing of the actuator by two bearings, and lubricant oil is fed into the oil passage from outside the control shaft at a position of one of the two bearings, which is located farther from the speed reducer than the other of the two bearings.

9. The actuator of a link mechanism for an internal combustion engine according to claim 8,
   wherein the open portion includes a guide configured to guide the lubricant oil to an inner periphery side of the open portion and to a position further outside than an inner diameter of the oil passage.

10. The actuator of a link mechanism for an internal combustion engine according to claim 1,
    wherein the open portion has an inner peripheral surface that is formed into a columnar shape.

11. The actuator of a link mechanism for an internal combustion engine according to claim 1,
    wherein the open portion has an inner peripheral surface which is formed such that an inner diameter increases in a step-like pattern from the another end side toward the one end side of the open portion in the rotation axis direction of the control shaft.

12. The actuator of a link mechanism for an internal combustion engine according to claim 1,
    wherein the open portion has an inner peripheral surface which is formed such that an inner diameter increases from the another end side toward the one end side of the open portion in the rotation axis direction of the control shaft, and
    wherein the oil passage opens between the another end portion and one end portion in the rotation axis direction of the control shaft in the inner peripheral surface of the open portion.

13. An actuator of a variable compression ratio mechanism of an internal combustion engine, comprising:
    a control shaft configured to rotate to vary characteristics of the variable compression ratio mechanism of the internal combustion engine;
    a speed reducer configured to reduce and transmit a rotation rate of an electric motor to the control shaft;
    an oil passage formed inside the control shaft; and
    an open portion which opens to face the speed reducer at one end side located on a side of the speed reducer, and which is in communication with the oil passage at another end side of the open portion,
    wherein an inner diameter of the one end side of the open portion is larger than an outer diameter of the control shaft,
    wherein the control shaft includes a flange on one end side, which is connected to the speed reducer, and
    wherein a length of the open portion from the one end side of the open portion to the another end side of the open portion in a rotation axis direction of the control shaft is greater than a thickness of the flange.

* * * * *